United States Patent
Haggerty et al.

(10) Patent No.: US 8,537,983 B1
(45) Date of Patent: Sep. 17, 2013

(54) MULTI-COMPONENT VIEWING TOOL FOR CONTACT CENTER AGENTS

(71) Applicant: Noble Systems Corporation, Atlanta, GA (US)

(72) Inventors: Christopher S. Haggerty, Atlanta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/790,947

(22) Filed: Mar. 8, 2013

(51) Int. Cl.
*H04M 11/00* (2006.01)

(52) U.S. Cl.
USPC .............. 379/88.14; 379/93.17; 379/265.06

(58) Field of Classification Search
USPC ............................................. 379/88.13–88.14
See application file for complete search history.

(56) References Cited

U.S. PATENT DOCUMENTS

| | | | |
|---|---|---|---|
| 7,062,437 B2 * | 6/2006 | Kovales et al. | 704/260 |
| 7,542,902 B2 | 6/2009 | Scahill et al. | |
| 7,752,043 B2 | 7/2010 | Watson | |
| 7,920,482 B2 | 4/2011 | Calahan et al. | |
| 8,190,992 B2 | 5/2012 | Tien et al. | |
| 8,345,832 B2 * | 1/2013 | Hamaker et al. | 379/88.11 |
| 2005/0141680 A1 * | 6/2005 | Tucker et al. | 379/88.18 |
| 2010/0153106 A1 * | 6/2010 | Frazier et al. | 704/235 |
| 2011/0202439 A1 * | 8/2011 | Ricci | 705/32 |
| 2011/0305326 A1 * | 12/2011 | Poirier et al. | 379/88.13 |
| 2012/0191730 A1 * | 7/2012 | Parikh et al. | 707/754 |

FOREIGN PATENT DOCUMENTS

WO     WO01/03008 A1     1/2001

OTHER PUBLICATIONS

Nobles Systems Corporation, Maestro 2010.4.1 User Manual, vol. 1, Jan. 11, 2012, 486 Pages, Noble Systems Corporation, Atlanta, GA 30319.
Nobles Systems Corporation, Maestro 2010.4.1 User Manual, vol. 2, Jul. 19, 2011, 422 Pages, Noble Systems Corporation, Atlanta, GA 30319.
Noble Systems Corporation, Maestro 2010.1.1 User Manual, vol. 2, Aug. 3, 2010, 416 pages, Noble Systems Corporation, Atlanta GA 30319.
Noble Systems Corporation, Maestro 2010.1.1 User Manual, vol. 1, Aug. 17, 2010, 454 pages, Noble Systems Corporation, Atlanta, GA.

* cited by examiner

*Primary Examiner* — Simon Sing

(57) ABSTRACT

Various embodiments of the invention provide a tool for reviewing the content of communications conducted between parties. A communication is analyzed between a first and second party to determine the words present. A set of keywords are developed that represent a subset of the words determined to be present in the communication. Occurrences of the keywords in the communication are mapped to times at which they occur. An interface is provided to a user that displays a representation of the communication comprising an identifier, such as an icon, representing a particular occurrence of a keyword with respect to a timeline. The user can search, locate and review a corresponding portion of audio containing the occurrence of the keyword. This may involve playing the corresponding portion of the audio containing the occurrence of the keyword and/or displaying the corresponding portion of a transcript of the audio portion.

21 Claims, 24 Drawing Sheets

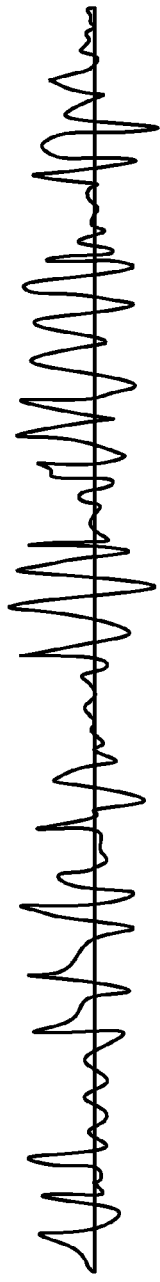
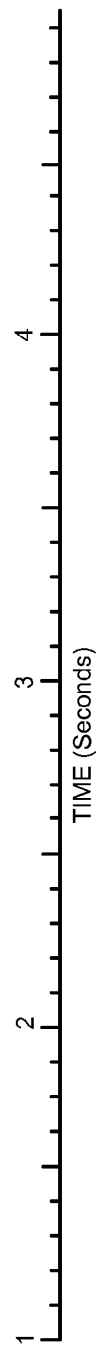
FIG. 2
FIG. 3

800

| Event | Time |
|---|---|
| Call Incoming | 0.0 |
| 806 — Hold #1 | 1:28 |
| 808 — Retrieve #1 | 1:57 |
| 810 — Hold #2 | 8:19 |
| 812 — Retrieve #2 | 9:32 |
| 814 — Transfer Out | 12:14 |

| Annotation | Time |
|---|---|
| 826 — Annotation #1 | 56.0 |
| 827 — Annotation #2 | 3.39 |
| 828 — Annotation #3 | 7:13 |
| 829 — Annotation #4 | 16:22 |

| Information Resource | Time |
|---|---|
| 866 — Routers/troubleshoot/setup | 4:45 |
| 867 — RouterA123/manual | 12:23 |
| 868 — RouterA123/bug_list | 15:54 |

| Keyphrase | Time |
|---|---|
| 886 — Router + Problem\|Issue | 0:45 |
| 887 — Reboot + Router | 1:48 |
| 889 — Green + Light + On | 2:28 |

FIG. 8D

MULTI-COMPONENT VIEWING TOOL FOR CONTACT CENTER AGENTS

BACKGROUND

Contact centers are used by organizations to provide communication channels for the organizations' customers. For example, various organizations may utilize contact centers for product and/or customer support. In many instances, upon establishing contact with a contact center, a party interacts with an agent employed by the contact center and the agent assists the party. For example, if a party calls to receive product support for a purchased product, then the agent may assist the party in providing the needed support for the product.

In many instances, it may be beneficial for another employee of the contact center to review the call conducted between an agent and a party, regardless of which party initiated the communication. For instance, returning to the example in which the party has contacted the contact center to receive product support, if the agent is not able to help the party, then the agent may forward the call to another person at the contact center such as the agent's supervisor or an expert on that product. At this point, it may be helpful for the supervisor or the expert to be provided with a tool to quickly review the contents of the communication between the agent and the party to facilitate providing the party with adequate support. In some instances, reviewing the call may also be used to evaluate the agent's performance or to verify information exchanged between the agent and the party.

Thus, there is a need for a comprehensive tool that is easy to use for reviewing the content and related aspects of the call. It is with respect to these considerations and others that the disclosure herein is presented.

BRIEF SUMMARY

In general, embodiments of the present invention provide computer program products, methods, systems, apparatus, and computing entities for providing a tool for reviewing communications conducted between parties. For instance, in various embodiments, an audio communication is analyzed between a first party and a second party to develop a transcript of the audio communication. In turn, the words spoken during the audio communication are analyzed to develop a set of keywords that includes a subset of the words spoken during the audio communication. For example, depending on the embodiment, the analysis on the words spoken may be carried out by performing voice analytics on the audio communication and/or performing text analytics on the transcript. In addition, each keyword in the set of keywords may have a number of occurrences in the audio communication that exceed a threshold value.

In particular embodiments, once the set of keywords has been developed, a graphical user interface ("GUI") is developed to display on a computer monitor. Typically, the GUI comprises a timeline representing the audio communication and displays a plurality of sets of icons in conjunction with the timeline. For these embodiments, each set of icons includes a text-based icon and an audio-based icon representing an occurrence of a keyword in the audio communication. In addition, the text-based icon and the audio-based icon are displayed on the GUI at one or more locations with respect to the timeline proximate to a time of the occurrence of the keyword in the audio communication. Further, the GUI may identify whether the first party or the second party is associated with each occurrence of the keywords in the audio communication.

Thus, for example, in particular instances the audio communication may be associated with a voice call that is transferred by the first party to a user so that the voice call may continue between the user and the second party. Accordingly, as a result of the transfer, the GUI is displayed on a computer monitor being used by the user so that he may review the voice call conducted thus far between the first party and the second party.

At this point, the user may select a text-based icon or an audio-based icon representing a particular occurrence of a particular keyword in the audio communication to gather more information about the particular occurrence. Accordingly, a portion of the transcript containing the particular occurrence of the particular keyword is displayed to the user if he selects the text-based icon representing the particular occurrence of the particular keyword. Likewise, a portion of the audio communication containing the particular occurrence of the keyword is played to the user if he selects the audio-based icon representing the particular occurrence of the particular keyword. Depending on the embodiment, the portion of the transcript displayed may be less than an entirety of the transcript of the audio communication and/or the portion of the audio communication played may be less than an entirety of the audio communication.

In particular embodiments, the user may provide an annotation that corresponds to a particular time associated with the audio communication. In turn, an annotation icon representing the annotation may be displayed on the GUI at a location with respect to the timeline proximate to the particular time associated with the audio communication. Likewise, in particular embodiments, an information resource icon representing an information resource accessed by the first party may be displayed on the GUI at a location with respect to the timeline proximate to a time when the first party accessed the information resource during the audio communication.

As is discussed in greater detail below, the subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein:

FIG. 2 illustrates the concept of components associated with a communication between an agent and a remote party in relation to a timeline.

FIG. 3 illustrates a mapping of keywords of a component in relation to time in accordance with various embodiments of the present invention.

FIGS. 8A-8D illustrate component mapping tables in accordance with various embodiments of the present invention.

DETAILED DESCRIPTION

Figure 1:
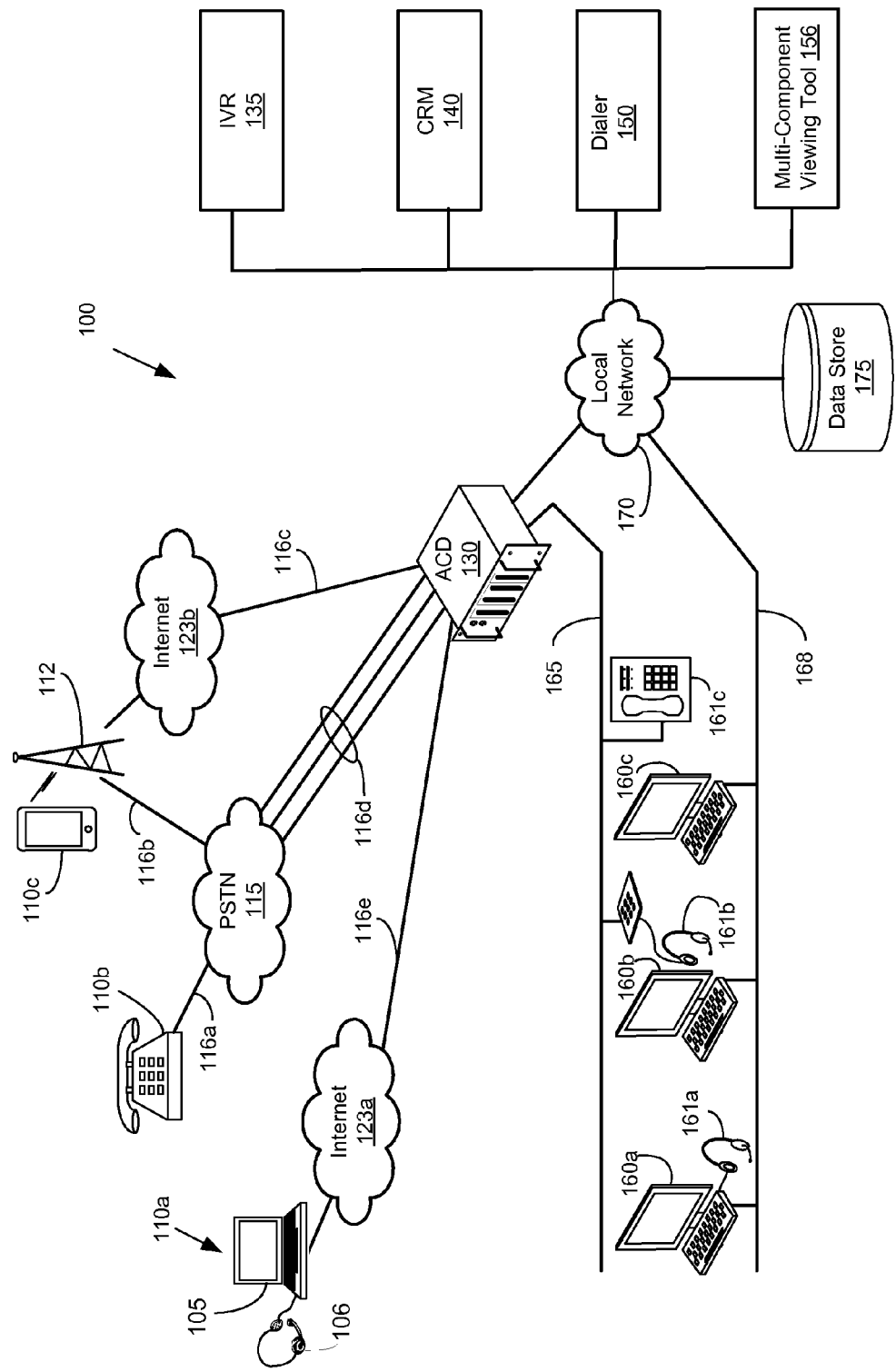
FIG. 1 shows one embodiment of a contact center architecture that may be used in accordance the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Embodiments of the invention may be utilized in various industries, as will become apparent to those of ordinary skill in the art as they read the disclosure. For instance, embodiments of the invention may be used in the legal profession to review and analyze depositions involving various parties. While in other instances, embodiments of the invention may be used to verify conformance to corporate policies by employees using telephones for conducting business. However, for purposes of this disclosure, applications involving contact centers are mainly used for demonstrating various embodiments of the invention.

With that said, the concepts and technologies disclosed herein provide for a multi-component viewing tool ("MCVT") that can be used in a contact center context to review the contents of a communication between an agent and a remote party. For instance, in particular embodiments, the MCVT may be used to search, locate, and review ("SLR") communications for certain content and/or events that occurred during the communications. In some instances, the MCVT can be customized to define the content of a communication that is analyzed, and to provide mechanisms for correlating the occurrence of the content with a timeline. While in some instances, other components of the communication, such as events, actions performed by the agent, and/or resources accessed by the agent, may also be received and correlated with the timeline. Finally, in some instances, icons for each of these events, actions, and/or resources are presented to the user on the timeline so that the user is able to select an icon to be presented with further information or a relevant portion of the communication.

Exemplary Contact Center Architecture

FIG. 1 shows one embodiment of a contact center architecture 100 that may be used in accordance with the various technologies disclosed herein. The contact center shown in FIG. 1 may process voice calls that are inbound-only, outbound-only, or a combination of both (sometimes referred to as a "blended" contact center). In some instances, the contact center may be referred to as a call center. Although many aspects of contact center operation are disclosed in the context of voice calls, in various embodiments, the contact center may process other forms of communication such as, for example, facsimiles, emails, text messages, video calls, and chat messages.

Since the contact center may handle calls originating from a calling party, or initiated to a called party, the term "party" or "remote party" without any further qualification, refers to a person associated with a call processed by the contact center, where the call is either received from or placed to the party. The term "caller," if used, will generally refer to a party communicating with the contact center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology. Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. Those skilled in the art will recognize that a variety of protocols and facilities may be used to convey voice calls.

In various embodiments, inbound calls from callers to the contact center may be received at an automatic call distributor ("ACD") 130. In particular embodiments, the ACD 130 may be a specialized switch for receiving and routing inbound calls under various conditions. The ACD 130 may route an incoming call over contact center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the ACD 130.

In various embodiments, calls may be routed over facilities 165 to an agent for servicing. That is, for example, the party may speak with an agent to receive customer service. An agent typically uses a computing device 160a-160c, such as a computer, and a voice device 161a-161c. The combination of computing device 160a-160c and voice device 161a-161c may be referred to as a "workstation." Thus, for these particular embodiments, the workstation collectively has a data capability and a voice capability, although separate devices may be used.

In various embodiments, the ACD 130 may place an incoming call in a queue if there are no suitable agents available, and/or it may route the call to an interactive voice response system (e.g., server) ("IVR") 135 to play voice prompts. In particular embodiments, these prompts may be in a menu type structure and the IVR 135 may collect and analyze responses from the party in the form of dual-tone multiple frequency ("DMTF") tones and/or speech. In addition, the IVR 135 may be used to further identify the purpose of the call, such as, for example, prompting the party to enter account information or otherwise obtain information used to service the call. In other configurations, the IVR 135 may be used to only provide announcements.

Depending on the embodiment, the interaction between the ACD 130, IVR 135, agent computers 160a-160c, as well as other components, may involve using a local area network ("LAN") 170. In particular embodiments, when an agent is interacting with a called or calling party, the agent may use his workstation computer 160a-160c to further interact with other enterprise computing systems, such as, for example, a customer relationship management ("CRM") server 140. A CRM server 140 may be used to integrate information from various enterprise business systems to facilitate the agent servicing the call. The agent can also transfer the call to another agent or supervisor, if required.

In addition to receiving inbound communications, including, for example, voice calls, emails, text messages, and facsimiles, the contact center may also originate communications to a called party, referred to herein as "outbound" communications. In particular embodiments, the contact center may employ a dialer 150, such as a predictive dialer, to originate outbound calls at a rate designed to meet various criteria. In various embodiments, the dialer 150 is typically configured to dial a list of telephone numbers to initiate outbound calls that may be stored in a data store 175. The dialer may originate calls by instructing the ACD 130 to originate the calls. Thus, in some embodiments, the ACD 130 may include functionality for originating calls, and if so, this functionality may be referred to as a private automatic branch exchange ("PBX" or "PABX"). In other embodiments (not shown), the dialer 150 may directly interface with voice trunks using facilities 116c, 116d, 116e to the PSTN 115 and/or Internet providers 123a, 123b for originating calls.

After the calls are originated, a transfer operation may connect the call with an agent or a queue, or in some instances the IVR 135.

Finally, the contact center architecture 100 may incorporate a MCVT 156 to perform various functions disclosed herein. In particular embodiments, the MCVT 156 may record and/or analyze a communication between an agent and a remote party. In addition, the MCVT 156 may perform analytics on the communication to extract information from the communication. For example, in instances involving telephone calls, the MCVT 156 may perform speech (e.g., voice) analytics on the telephone calls to extract information spoken during the telephone calls. In other instances, the MCVT 156 may perform text analytics (e.g., text mining) to extract information found in communications. As discussed in further detail below, in particular embodiments, the MCVT 156 presents information about the content of a communication using a graphical user interface and may include information about other related events or agent actions associated with the communication. Thus, in particular embodiments, the MCVT 156 provides an easy to use tool to allow specified content to be searched, located, and reviewed for a given communication.

A number of different analytics approaches may be employed depending on the types of communications being analyzed and the embodiment. For example, in cases of telephone calls, the MCVT 156 may make use of one or more of a phonetics approach, large-vocabulary continuous speech recognition (LVCSR) approach, and/or direct phrase recognition approach in performing speech (voice) analytics on the telephone calls. Further, a number of different text mining software applications may be utilized for performing text analytics. In addition, depending on the embodiment, the MCVT 156 may be further configured to perform one or more functions with respect to the results produced from performing analytics on one or more communications. For instance, as detailed further below, in particular embodiments, the MCVT 156 may be configured to use analytics results to identify keywords found within a communication and to construct a graphical user interface reflecting a timeline with respect to the communication. Further, in particular embodiments, the MCVT 156 may be configured to monitor communications between agents and outside parties in real-time in order to provide such interfaces for these communications.

Finally, it is noted that in particular embodiments, one or more capabilities of the MCVT 156 may instead be incorporated into one or more other components found in the contact center architecture 100. For instance, in particular embodiments, one or more capabilities of the MCVT 156 may be incorporated into the CRM server 140. In addition, in particular embodiments, one or more capabilities of the MCVT 156 may be performed by a third-party provider as a service to the contact center. For example, in one embodiment, a third-party provider may perform the analytics on stored communications from the contact center and provide the results of the analysis to the contact center.

Although a number of the above components may be referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication service (a so-called "communication-as-a-service" or "CaaS") to a contact center operator. In other embodiments, the MCVT 156 is provided as a hosted service to the contact center. Thus, there is no requirement that the components identified above actually be located in the contact center or be controlled by a contact center operator. In addition, depending on the embodiment, the agent positions may be remotely located from the other components of the contact center, sometimes referred to as a "virtual contact center." In particular instances, users of the MCVT 156 may be located remotely from the contact center. Those skilled in art will recognize FIG. 1 represents one possible configuration of a contact center architecture 100, and variations are possible with respect to the protocols, facilities, components, technologies, and equipment used.

Service Overview

In various embodiments, the MCVT 156 provides a viewing tool that facilitates reviewing the content, events, and/or information associated with a communication such as a voice call. Specifically, in particular embodiments, the MCVT 156 facilitates a user's ability to search, locate, and review ("SLR") the content, events, and/or information associated with a communication. For instance, depending on the embodiment, the MCVT 156 may be used for various purposes such as verifying what transpired during a communication, reviewing the content of a communication, and/or evaluating an agent's handling of a communication. In addition, in particular embodiments, the MCVT 156 may also be used to confirm the information exchanged in a communication, verify that certain policies governing agent conduct on a communication were followed, evaluate an agent's performance, and/or more efficiently address unresolved issues when a communication is transferred. Thus, for purposes of illustration and not for limitation, the concepts and technologies described herein are exemplified by a voice call involving an agent in a contact center communicating with a remote party. However, it should be understood that the concepts and technologies described herein may also be used in contexts involving other forms of communications. Further, examples of other embodiments will be given, and those skilled in the art will realize that many other applications and examples are possible in light of this disclosure.

In various embodiments, the MCVT 156 typically includes one or more modules such as a graphical user interface module that a user (such as a contact center supervisor) interacts with to review the content, events, and/or information associated with a call between an agent and a remote party. That is, in particular embodiments, the MCVT 156 provides a number of tools to quickly search, locate, and review content of the call and to further correlate the content with other events and/or information. Depending on the embodiment, the MCVT 156 may be used in real-time or in non-real-time applications, as will be seen. Typically, the real-time aspects depend in part on the application for which the MCVT 156 is being used. For example, addressing an unresolved issue on a customer service voice call that needs to be reviewed quickly by a party to whom the call has been transferred to may warrant real-time or near real-time use of the MCVT 156. However, other instances, such as performance evaluation of calls handled by agents for quality purposes, may warrant non-real-time use of the MCVT 156.

In various embodiments, the content, events, and/or information associated with a particular call may be associated with a timeline of the call. Depending on the embodiment, the content, events, and/or information may be in different forms; however, they are generally referred to as "components." That is, for various embodiments, any related set of information that can be correlated to the timeline for a call (e.g., for a communication) can be view as a component of the call. Examples of a component may include: audio of the call; a text transcription of the call; a keyword spoken during the call; an annotation made during the call or added by another when reviewing the call; an event that occurred during the call; information obtained by the agent during the call; etc. Thus, in particular embodiments, each of these components is correlated with the timeline for the call as a means to facilitate the SLR functions for the call. For instance, the MCVT 156 may provide the timeline for the call on an interface, and the timeline may display icons to represent where certain keywords were spoken during the call and/or where certain information was obtained by the agent during the call so that these icons can be used to facilitate the SLR functions for the call.

In various embodiments, the content of the call is analyzed by a speech analytics system against the backdrop of the timeline to define the words spoken during the call and when such words were spoken. Accordingly, a set of keywords can be derived from the words spoken during the call and indicated on the timeline. Thus, in particular embodiments, a user can then easily select an icon displayed on the timeline for a keyword to review the audio and/or text corresponding to the keyword. In other embodiments, other types of components can be recorded against the timeline and selected. For example, a web cam generating real-time video of the agent during the conservation could be recorded and processed as a component of the call that can be searched and reviewed.

Components

FIG. 2 illustrates the concept of different types of components that may be associated with a call between an agent and a remote party, and which may be correlated with a timeline. In FIG. 2, the speech (e.g., audio) component 200 is illustrated as a timeline with a waveform representing speech. Although the waveform is not typically comprehensible by a human, it can be used to ascertain where speech is present as opposed to silence during the call. Therefore, the utility of this waveform representation of the speech that occurred in the call may be minimal for some applications and its presence is not required in each embodiment. However with that said, in particular embodiments, its presence can be used to represent the speech component 200 and hence is shown here for that purpose. Depending on the circumstances, the speech component 200 can represent speech from the agent, the remote party, or both. However, as will be seen, the speech of one party on a call can be illustrated as a separate component from the speech of another party.

The next component shown in FIG. 2 is the text component 202. Depending on the embodiment, the text component 202 can reflect text-based words spoken by one or both of the parties involved in the call. In this example, the call involves the remote party receiving product support from the agent and the text component 202 comprises a transcription of the content in the speech component 200. In various embodiments, the text making up the text component 202 is typically the output of a speech analytics engine, but in other embodiments, the text may be human work product, or a combination of the two (e.g., speech analytics text that has been edited by a human). For this particular example, the text shown in the text component 202 is not merely a transcription of the words spoken during the call but is mapped in some manner with respect to time. That is, the text shown in the text component 202 is correlated with time by its positioning. Thus, the word spacing reflects the time involved in speaking the word and when that word was initiated. Just as the speech component 200 reflects time, so does the text component 202. Consequently, the word spacing may not be "even" or as "regular" as text that is produced by a word processor.

The next component is the keywords component 204. In various embodiments, keywords are a subset of the words that are found in the text component 202. Typically, keywords are derived by filtering and processing the set of words in the text component 202. In various embodiments, this filtering develops a set of keywords that reflects main points of the call. For example, even without reading the text component 202, the keywords component 204 indicates the call involves a problem with a router or phone with respect to recognizing the router. In this particular instance, the keywords are shown in the order in which they appear in the text component 202 (which coincides with the order in which they were spoken during the call). Again, the spacing between keywords reflects the time when the keywords occurred in the call.

In various embodiments, all of the above components have a common aspect in that they reflect the passing of time and can be correlated with time. For instance, in particular embodiments, the speech data in the speech component 200 inherently reflects time, otherwise the speech would be incomprehensible. As will be seen, in these particular embodiments, the ability to identify a point in time for a component is the basis for performing some of the functions of the MCVT 156. Therefore, the timeline 206 shown below the keywords component 204 in FIG. 2 serves as a reference or navigation guidepost to indicate where specific information associated with the components has occurred or can be located. For these embodiments, the timeline 206 is technically not considered a component of the call, but reflects time, which is considered an attribute of each component 200, 202, 204.

Turning now to FIG. 3, this particular example provides the keyword mapping table 300 listing the keywords in alphabetical order. Thus, even though the keyword "phone" 302 occurred in the call after the keyword "problem" 304, the keyword "phone" 302 is indicated first in the table. As additional keywords are detected, the keyword mapping table 300 increases in size, both in the number of keyword entries as well the time when existing keywords are repeated during the call. Depending on the embodiment, the table 300 may be constructed in other ways (e.g., using other data constructs) and/or may have a different order defined for the entries. For instance, in one embodiment, the keyword mapping table 300 may be organized by terms of frequency, e.g., the more frequently occurring keywords appearing first in the table 300. However, the creation of the keyword mapping table 300 in an alphabetical order may facilitate human review of the table should the contents be presented to a user for various reasons. That is, an alphabetical order may allow a human to quickly search and learn what keywords appear in the call and how many times each keyword occurs.

FIGS. 2 and 3 show one relatively simple embodiment of components 200, 202, 204 and the corresponding keyword mapping table 300 for a short portion of a call. However, these concepts can be applied to other components associated with a call as illustrated, in part, by reviewing the architecture of the MCVT 156 shown in FIG. 4. For instance, in particular embodiments, the MCVT 156 may receive various inputs 410, 420, 425, 430, 435, sometimes referred to as native component inputs, that are processed as components and correlated, or mapped, to time. These inputs, once mapped, may be referred to as mapped inputs or mapped components. For example, in FIG. 4, the audio inputs may originate from stored audio 405 retrieved from memory or some other storage medium and provided to an audio mapping module 440. Alternatively, the audio inputs could be real-time audio 410 that is obtained from an active call in the contact center.

Depending on the embodiment, the audio mapping module 440 may incorporate a speech analytics engine that processes the audio input and produces mapped speech 464, mapped text 465, and keywords 470. In particular embodiments, the mapped speech 464 is capable of being indexed with respect to time so that a particular time can be easily located in the audio input (e.g., data for the stored audio 405 or the real-time audio 410). Depending on the embodiment, the mapped speech 464 may be very similar in content and structure as the native audio input form, while in other embodiments, time-related indexing information may be added to the data for the real-time audio 410 or stored audio 405, or otherwise modified in some manner. It is noted that in particular embodiments, the audio mapping module 400 may not require the speech analytics engine to perform this function.

As mentioned, the audio mapping module 440 may also generate mapped text 465. For instance, in one embodiment, the speech analytics engine may produce a transcription of the call in which the words are correlated to time in some manner. Depending on the embodiment, various storage and/or data structures may be defined for storing the text and the associated time for each word. For example, in one particular embodiment, the data structure may comprise storing a word along with a time for the beginning of the particular word. While in another embodiment, the data structure may comprise periodic time markers that are used in conjunction with mechanisms for interpolating when a word occurs such as, for instance, relating the text to the periodic markers so that the beginning of the word can be estimated. For example, returning to FIG. 2, if markers are defined for every second that occurs in the speech (or which can otherwise be reconstructed from the speech), and if the phrase "with my router" occurs between seconds two and three, then the time for each word in the phrase can be readily estimated. Thus, in many instances, merely transcribing the audio into text (without any correlation to time) is not sufficient for producing the mapped text 465 and/or the text component 202 for various embodiments.

Further, the audio mapping module 440 may also produce a keyword mapping 470. Generally speaking, a keyword mapping 470 is a mapping of select individual words that were spoken in the call with respect to time. In particular embodiments, if the audio mapping module 440 is able to transcribe the speech, then the module 440 may use various techniques, as will be seen, to generate keywords from the mapped text 465. Depending on the embodiment, the keyword mapping 470 may be maintained in the same data store that maintains the mapped text 465 or in a different data store. A "keyphrase" is similar in concept to keywords, but a keyphrase is a combination of words typically associated with logical constructs. In many instances, a keyphrase is determined from an external source relative to the audio mapping module 440 such as, for example, a user indicating a keyphrase to the MCVT 156 and/or a library in the form of a file or database that defines common keyphrases for certain contexts. This is because, in many instances, it is easier for an external source to define useful keyphrases for a particular context. However, it is possible in some embodiments for the audio mapping module 440 to generate the list of keyphrases based on an algorithm, heuristics, or past usage.

Continuing on, depending on the embodiment, other inputs may be processed as components by the MCVT 156. For instance, similar to audio, in particular embodiments, the MCVT 156 may comprise a video mapping module 445 for processing video that may be either a real-time video input 420 or a stored (non-real-time) video input 415. In particular instances, the video mapping module 445 may process the audio portion of the video input 415, 420 to produce the mapped speech 464, the mapped text 465, and/or the keyword mapping 470. For example, in one embodiment, the video mapping module 445 merely extracts the audio from the video input 415, 420 and performs a mapping similar to the audio mapping module 440. Further, in various embodiments, the video mapping module 445 may also produce a mapped video output 475 that is correlated with time. In many instances, minimal processing by the video mapping module 445 may be involved to produce the mapped video output 475 since video is typically inherently correlated with time.

Figure 4:
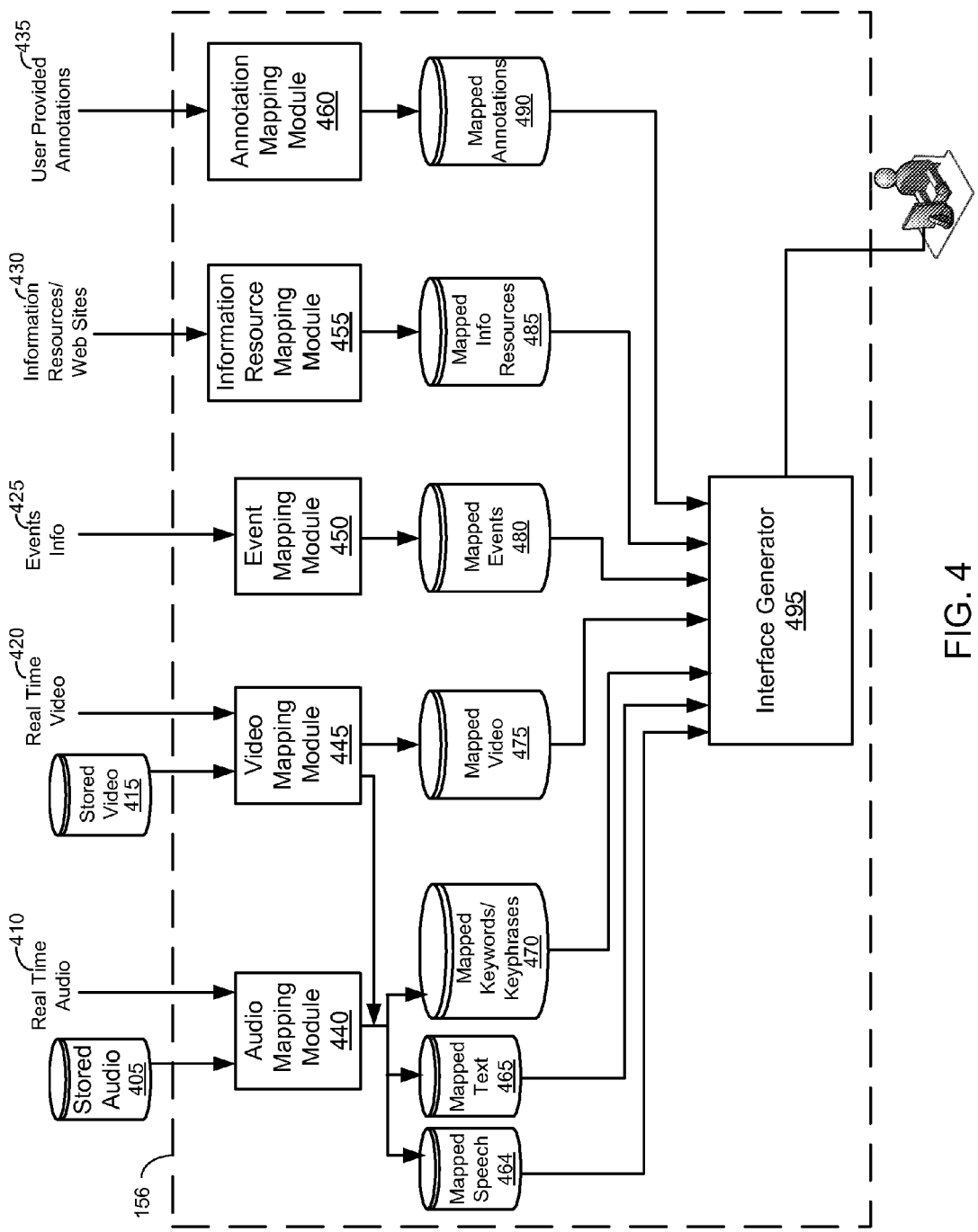
FIG. 4 illustrates an architecture for a multi-component interface tool in accordance with various embodiments of the present invention.

Another input shown in FIG. 4 that the MCVT 156 (e.g., by an event mapping module 450 of the MCVT 156) processes in particular embodiments comprises events information 425, or simply information on "events," to generate event components. Events are generally viewed as actions that are defined for a particular application. For instance, in the context of a contact center, an event may comprise a call handling action such as when a call: arrived; was answered; was placed on hold; was retrieved from hold; was transferred; and/or was disconnected. While in another instance involving a network operations center fielding service calls, an event may be a command initiated by an agent handling a call to: reset a device; reboot a computer; download a file; etc. In various embodiments, the events information input 425 typically comprises one or more messages indicating particular events (however defined). In particular embodiments, a message is typically time stamped when received by the event mapping module 450 and the module 450 identifies an event component from the message and stores the component as one of the mapped events 480 in a suitable structure such as an event mapping table.

Another input that is processed by the MCVT 156 (e.g., by an information resource mapping module 455 of the MCVT 156) in various embodiments is information resources 430 accessed by the agent during the call. More specifically, the information resource mapping module 445 receives information resources input 430 and records the resources accessed by the agent during the call. Typically, the information resource mapping module 445 time stamps the different resources and stores them as mapped information resources 485 in a suitable data structure such as an information resource mapping table.

In various embodiments, the mapped information resources 485 generally identify what information was accessed, retrieved, or viewed by the agent and at what times during the call. For example, a particular mapped information resource 485 may identify a web site or document the agent viewed or retrieved to his workstation while on the call. Thus, in particular embodiments, the mapping of information resources requires suitable infrastructure for capturing the agent's request for information resources and providing the requested information resources as the information resources input 430 to the MCVT 156.

The last input shown in FIG. 4 that the MCVT 156 (e.g., an annotation mapping module 460 of the MCVT 156) processes in particular embodiments is user provided annotations 435. This input 435 comprises notes or comments provided by users either during the call or in reviewing the call. Again, depending on the embodiment, suitable infrastructure may be required to capture the annotations generated and to provide them as input 435 to the MCVT 156. For instance, in particular embodiments, the annotations may be provided by the user directly to the MCVT 156. The annotation mapping module 460 receives this input 435 and generates mapped annotations 490 that are stored and associated with time. In particular embodiments, a mapped annotation 490 may include meta-data such as, for example, the author who created the annotation and when the annotation was created.

In various embodiments, inputs for other component types may be defined. For example, in one embodiment, another component type may be emails sent/received by/from the agent. Similarly, another component type may be text messages, chat messages, social messaging services, etc. Depending on the embodiment, these component types may be variously defined based on what is encompassed in a particular component. For example, in one embodiment, a text message component may be defined as any text sent or received by an agent with a remote party during a call. While in another embodiment, a text message component may be defined as any text sent or received by an agent regardless of whether the other party was remote. Depending on the circumstances, there may be utility in reviewing texts sent by an agent to a remote party. For example, an agent dealing with a product support issue may text instructions to a caller. Thus, it may be useful in reviewing the call to see the texted instructions that were provided to the remote party.

Thus, as shown, the output of each mapping module 440, 445, 450, 455, 460 in various embodiments is a mapped component 464, 465, 470, 475, 480, 485, 490 of some form. Further, in various embodiments, each stored mapped component 464, 465, 470, 475, 480, 485, 490 can be correlated to time by the MCVT 156 in some form to facilitate easy searching, locating, and reviewing of content, events, and/or information associated with a communication. As is provided in more detail below, various data structures, timing mechanisms, and access methodologies can be devised and used to accomplish the SLR functions.

The final element shown in FIG. 4 is the interface generator ("IG") 495. In various embodiments, the IG 495 is a module of the MCVT 156 that is configured to retrieve the components (e.g., speech, text, keywords, video, events, information resources, and/or annotations) of a communication, and to present these components to a user via a graphical user interface ("GUI"). Thus, in various embodiments, the user may interact with the IG 495 to perform the various SLR functions for each component. For instance, in particular embodiments, the IG 495 allows the user to manipulate the various components and/or to select or indicate a search term, such as a keyword or keyphrase. Further, in particular embodiments, the IG 495 can graphically indicate via icons where a component occurs in the call with respect to the agent, the remote party, or both. Thus, in an instance of a keyword for example, the user may review the speech component (or text component) for a particular occurrence of the keyword by selecting the appropriate icon for the speech component (or the text component) for that occurrence of the keyword. That is, for instance, the IG 495 can be configured to allow the user to select an icon to play a portion of the audible speech associated with the occurrence of the keyword. In addition, the IG 495 can be configured to allow the user to select components to be searched or displayed. For example, the user may request the IG 495 to display the events that occurred during the call or the information resources that were utilized by the agent during the call. In other embodiments, the IG 495 may perform other functions as will be seen.

Depending on the embodiment, the MCVT 156 can execute in real-time, near real-time, non-real-time, or combinations thereof. For instance, returning to FIG. 4, this can be illustrated by examining the audio input, specifically audio input in the form of stored audio 405 or real-time audio 410. Typically, processing the audio input involves ingesting the audio data in a linear manner by the audio mapping module 440 and applying speech analytics algorithms to ascertain the spoken words so that the mapped speech 464, mapped text 465, and/or keywords 470 are produced. In the case of stored audio 405, the audio mapping module 440 is configured to retrieve and process the stored audio 405 in this manner to produce the mapped speech 464, mapped text 465 and/or keywords 470. This is typically considered to be performed in non-real-time since the call has already been completed and stored. However, in particular instances, it is considered a minor variation for the audio mapping module 440 to instead receive the audio data in real-time (e.g., as real-time audio 410) as opposed to in non-real-time because in these instances, the audio mapping module 440 performs essentially the same processing on the real-time audio 410 as with respect to stored audio 405 to produce the mapped speech 464, mapped text 465, and/or keywords 470, but does so in a real-time or a near-real-time manner.

For example, one application that may involve real-time or near-real-time processing is when an agent transfers an existing call to a supervisor and the supervisor desires to quickly review what has taken place between the agent the remote party thus far. In this case, the MCVT 156 is configured to perform its processing of the audio data in real-time or near-real-time in order for the supervisor to have a current view of the call components. However, in contrast, if the supervisor instead desires to use the MCVT 156 to review one or more calls to evaluate an agent's performance at the end of a review period (e.g., after a month), then the processing could occur after hours or on a weekend. In this instance, the application involves non-real-time processing.

Further, depending on the embodiment, the inputs provided to the MCVT 156 need not all be received and processed in a real-time or in a non-real-time manner. That is, in some embodiments, it is possible to receive and process some aspects in real-time and others in non-real-time. For instance, in a variation of the above example, the MCVT 156 may be configured to process the speech as real-time audio 410 and to store the mapped speech 464, mapped text 465, and keywords 470. However, with respect to the information resources input 430, this input 430 may be configured to be stored without initially being processed by the MCVT 156. Thus, in this instance, when the GUI portion of the IG 495 presents the call components to a user, the IG 495 retrieves the mapped speech 464, mapped text 465, and keywords 470 to be used to construct the GUI portion and at the same time, the MCVT 156 processes the information resources input 430 and provides the mapped information resources to the IG 495 to be used to further construct the GUI portion. Thus, in this example, the various components that make up the GUI are processed independently by the MCVT 156 and at separate times.

It should be apparent in light of this disclosure to those of ordinary skill in the art that for various embodiments, the MCVT 156 requires that the different components and related data of a call, either in their native input form or in their mapped form, to be capable of being referenced and linked to each other and to the call. This is because the MCVT 156 typically processes a number of calls and each call must be distinctly identified along with its corresponding components. In addition, the audio channels for each party for calls may be treated differently. For example, in particular instances, only the agent's speech may be processed while in other instances, both the agent's and remote party's speech may be processed. Further, each channel may have different components associated with it. For example, information resource components are typically only associated with the agent since the remote party is usually separate from the contact center, and thus only the agent's channel is associated with information resource components. Thus, in various embodiments, mechanisms are required to relate all these structures in a cohesive and flexible manner. Once this is accomplished, then various combinations of processing the native or mapped components are usually possible for these embodiments.

Next, attention is focused on processing the audio input by the audio mapping module 440 according to various embodiments. As noted earlier, the audio mapping module 440 may produce three outputs for a particular call. Firstly, it may produce mapped speech 464, which may be accomplished with minimal processing of the audio input. Secondly, it may produce mapped text 465, which may be accomplished using existing technologies for analyzing and recognizing audio. Thirdly, it may produce keywords/keyphrases 470. In a preferred embodiment, the mapped speech 464 is an essential component for analyzing the call between the agent and the remote party and the mapped text 465 is typically present. Further, once the mapped text 465 of the call is generated, the data for the mapped text 465 may be processed to generate the keywords/keyphrases 470. In particular embodiments, the utility of the mapped text 465 is greatly enhanced by using keywords and/or keyphrases and so some form of the keywords/keyphrases 470 is typically generated by the MCVT 156.

Depending on the embodiment, the set of keywords can be defined as a set of every word present in the mapped text 465. However, such a definition typically reduces the utility of having keywords identified since the set of keywords is merely a list of every word spoken during the call. Thus, in various embodiments, the concept of keywords requires there to be some selective filtering of the words spoken during the call to produce a subset of keywords. A process flow for filtering the words spoken during a call to generate the set of keywords according to various embodiments is shown in FIGS. 5 and 6.

It is noted that the logical operations described in the process flows provided herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Figure 5:
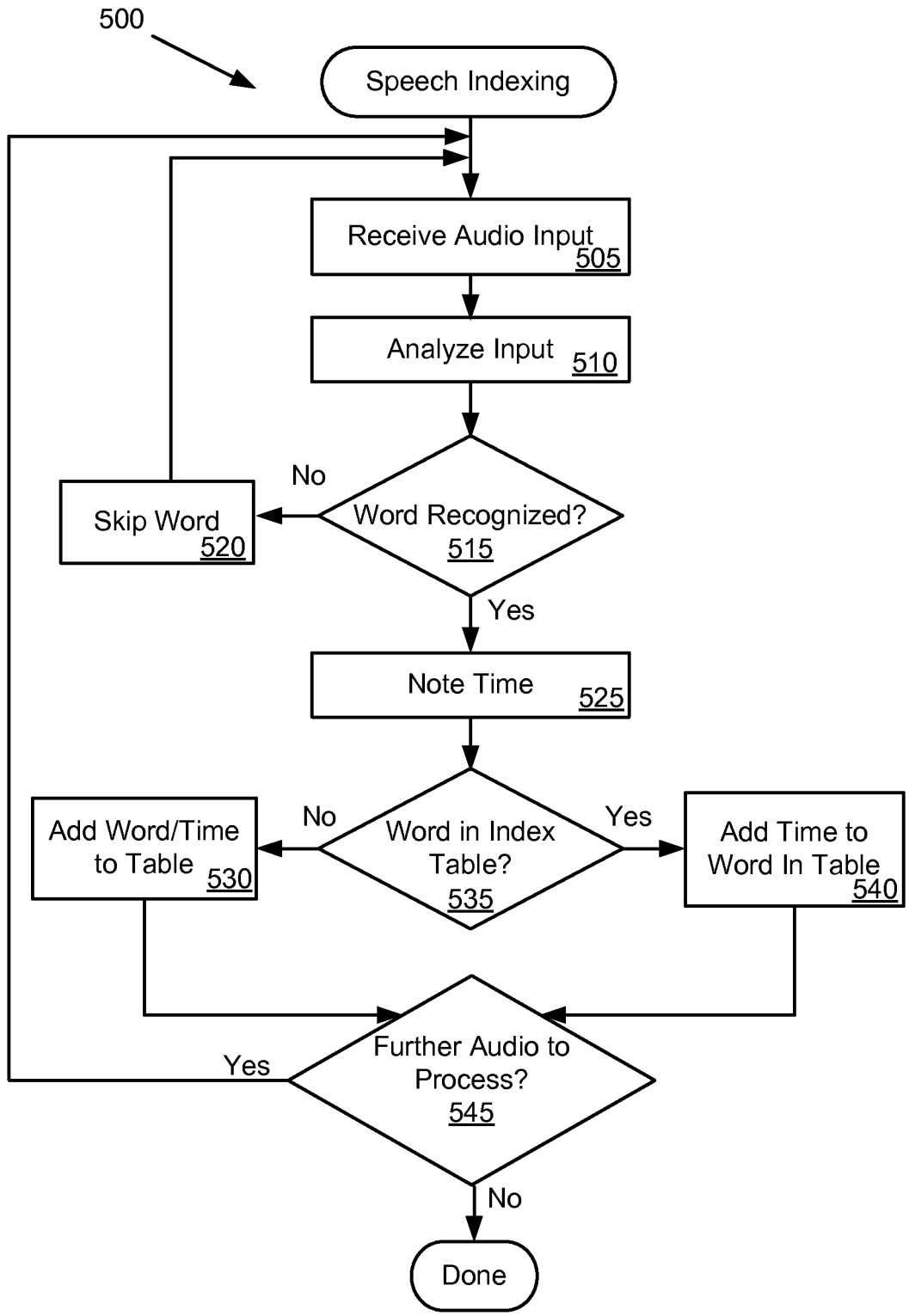
FIG. 5 shows a process flow for generating a word index table in accordance with various embodiments of the present invention.
Figure 6:
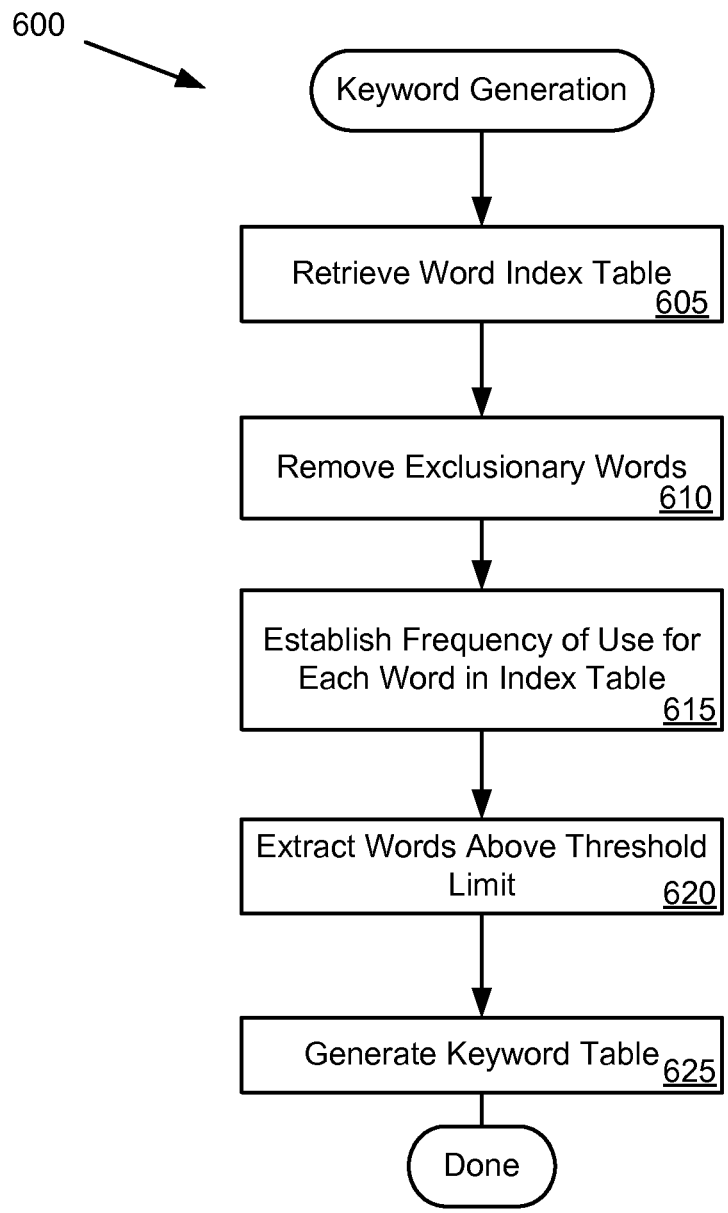
FIG. 6 shows a process flow for keyword generation in accordance with various embodiments of the invention.

Turning now to FIG. 5, the process 500 shown in this figure generally develops a list of words and their frequency of use in a call. The process 500 begins in operation 505 with receiving the audio input of a call. The audio input can be real-time audio data 410 or stored audio data 405. The audio mapping module 440 then employs a speech analytics engine to analyze the audio input in operation 510. If a word is not recognized in operation 515, then the word is skipped in operation 520 and the next word from the audio input is processed in operation 505. However, if the word is recognized in operation 515, then the time the word occurred (e.g., was spoken) in the call (the time the word occurs in the audio) is noted in operation 525. Next, a test is performed in operation 535 to see if the word is already in the word index table. For this particular embodiment, the word index table eventually contains each recognized word in the audio. Thus, when a new word is initially encountered, then the word and its time are added to the table in operation 530. If the word is already in the table, then the time that the word occurs in the audio is added to that word's entry in the table in operation 540. If there is additional audio input in operation 545, then the process 500 loops back to receiving the next input at operation 505, otherwise the process 500 is completed.

At this point, the word index table contains all the recognized words and their relative frequency. Although not necessary, the table may be organized in alphabetical order. In particular embodiments, the output of this process is a list similar to the table 300 shown in FIG. 3. Depending on the embodiment, separate tables can be generated for words spoken by the agent and by the remote party or a single table can be generated for both parties. This word index table may be used by itself in various embodiments to provide a user with a complete index of words in the text. In addition, the word index table may be used to allow a user to search for a word that was recognized during the call and/or to create a keyphrase or a custom keyword list.

In various embodiments, the MCVT 156 (e.g., the audio mapping module 440) uses the word index table to create another table known as the keyword table. A process 600 for creating this table is shown in FIG. 6 according to various embodiments. The process 600 begins with retrieving the word index table in operation 605. Once, the table is retrieved, in operation 610, exclusionary words are removed from the word index table. Exclusionary words are words that are removed from the word index table because they are generally of marginal use with respect to reviewing the content of the call. For example, the words "I," "the," "to," "you," "hey," "umm," etc. frequently do not add significant value to the purpose and nature of the call. Further, these words may appear quite often in the party's speech and their high frequency of use may skew a frequency ordered keyword list. Depending on the circumstances, a list of exclusionary words may include, for example, a list of prepositions, pronouns, and similar words that add little value and may be based on a library of words (e.g., a predefined list). Further, the list of exclusionary words may be routinely updated based on experience and/or may be manually edited by a user prior to the list being applied to the word index table. Once the exclusionary words have been removed from the word index table, a frequency of use for each remaining word is determined in operation 615. For particular embodiments, this is a numerical value indicating how many times the word occurred in the call.

Next, the words which have a high frequent usage are extracted in operation 620. Depending on the embodiment, this may be based on a threshold value that may be defined and refined over time. For example, a threshold value may be set to extract the top 10% frequently used words from the word index table. In this instance, since many of the commonly used words (e.g., exclusionary words) have been already excluded from the word index table, the top 10% frequently used words of the remaining words found in the word index table are likely to include relevant keywords. Thus, the resulting list of extracted words is then used to generate the keyword table in operation 625.

Accordingly, in various embodiments, the output of FIG. 6 is a keyword list (e.g., the keyword table) that represents the most commonly used words of significance found in the communication. This list is, by definition, typically smaller than a list of the entire words found in the communication and frequently allows a user to readily scan the list (if so presented) to identify keywords he may wish to search for in the communication. In particular embodiments, the list may be arranged in alphabetical order so that a user looking at the list and searching for a particular word can easily determine if the word is present in the list. Frequently, the user may not know in advance what keyword(s) to use when searching for content of a call. Thus, in these instances, looking at the commonly used words in the keyword list may inform the user as to the appropriate keyword to search for. For example, a call involving a consumer complaint about a car may involve the use of one or more of the words "car," "auto," "automobile," "truck," "SUV," "vehicle," and the make/model of the car. A quick scan of the keyword list may indicate that a party used the word "SUV" more frequently than the other terms. Thus, the user may opt to use "SUV" as the keyword for searching purposes.

Figure 7:
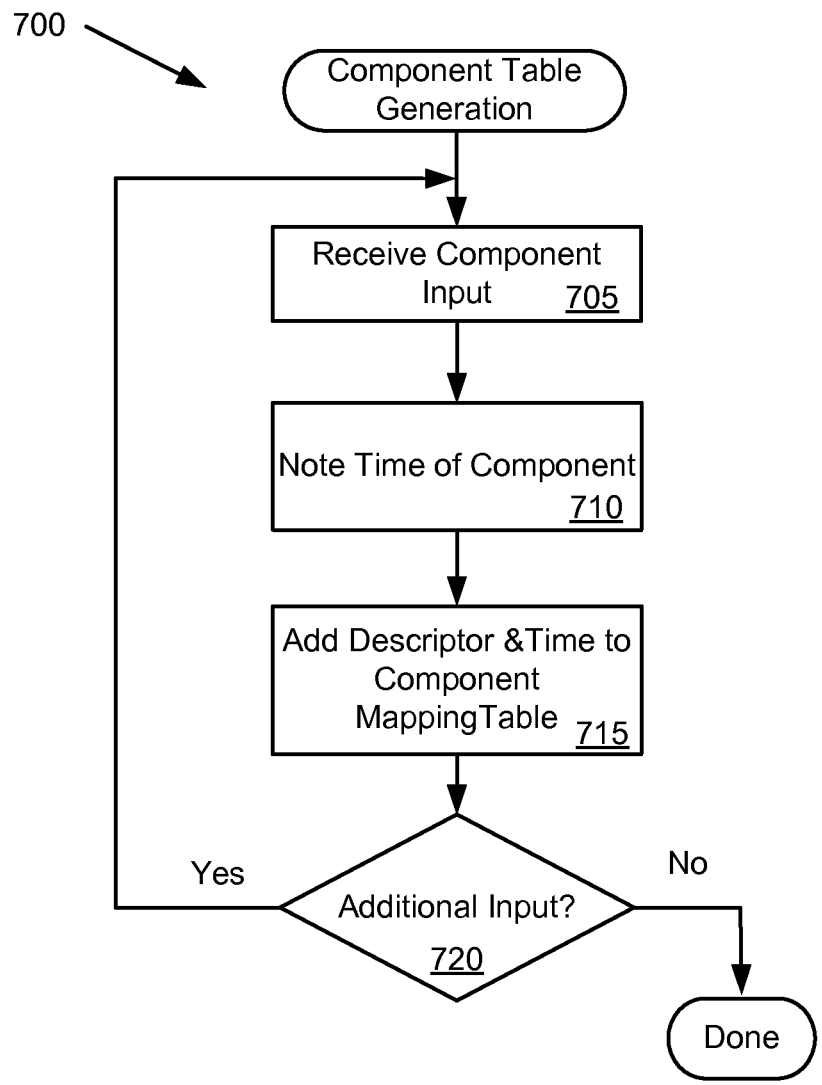
FIG. 7 shows a process flow for generating a component mapping table in accordance with various embodiments of the present invention.

It is noted that for various embodiments, the processes 500, 600 carried out by the audio mapping module 440 are typically used for each communication processed by the MCVT 156, but not necessarily. In addition, in many instances, the other components, such as video, events, information resources, and user provided annotations, may or may not be present in various combinations based on the embodiment. Thus, not all embodiments of the MCVT 156 include the audio mapping module 440, the video mapping module, 445, the event mapping module 450, the information resource mapping module 455, and/or the annotation mapping module 460. With that said, a generic process flow for the other mapping modules 445, 450, 455, 460 besides the audio mapping module 440 is shown in FIG. 7. This process 700 begins with receiving the appropriate component input in operation 705. The time that the component occurred in the call (e.g., occurs in the input) is noted in operation 710. A descriptor of the component and its time is added to the appropriate component mapping table in operation 715. The process loops back in operation 720 if there are additional component inputs. Otherwise, the process is completed.

Embodiments of exemplary outputs of particular mapping modules 440, 445, 450, 455, 460 are shown in FIGS. 8A to 8D. The first output shown in FIG. 8A is an event mapping table 800 comprising an event column 802 and a time column 804. The first event 806 entered into the table 800 is a hold event that occurred one minute and twenty-eight seconds into the call. The next event 808 is a retrieve event, followed by a hold event 810, another retrieve event 812, and a transfer event 814. In this particular embodiment, the events 806, 808, 810, 812, 814 are call handling operations. However, in other embodiments, the events could be defined to be any number of other actions that occurred or were initiated by the agent during the call.

FIG. 8B illustrates an annotation mapping table 820 that comprises an annotation column 822 and an associated time column 824. Depending on the embodiment, each annotation 826, 827, 828, 829 may comprise the actual text entered by a user or may comprise a link to the actual annotation text. In particular embodiments, the MCVT 156 uses the annotation mapping table 820 to inform a reviewer as to what annotations were provided by others while reviewing the call.

FIG. 8C is an information resource mapping table 860 that identifies the information resources accessed by the agent during the call in a first column 862 and the times when these resources were accessed in a second column 864. For example, the first information resource 866 accessed by the agent was "Routers/troubleshoot/setup" that identifies a troubleshooting manual for setting up a router. The second information resource 867 ("RouterA123/manual") accessed by the agent was a router manual for a model A123 router.

Finally, the third information resource 868 ("RouterA123/bug_list") accessed by the agent was a list of known bugs for the A123 router.

In various embodiments, each of these mapping tables 800, 820, 860 can vary in structure and design, but they each typically facilitate identifying and associating certain components with a time for a particular call. Thus, in particular embodiments, the IG 495 uses these mapping tables 800, 820, 860 to indicate the associated components for the call as discrete icons on a timeline for the call, in which the position of the icon on the timeline is mapped for each component at the corresponding time found in the corresponding mapping table 800, 820, 860. Further, depending on the embodiment, the icons can vary in size, color, and shape for each type of component. This allows the user to quickly ascertain what content or events occurred in the call and when.

Recall that in particular embodiments, the audio mapping module 440 can also maintain a list of keyphrases. For these particular embodiments, a keyphrase is generally a combination of words and this combination may be further defined by certain criteria, such as logical operators. Various syntaxes can be defined to indicate the criteria. For example, the keyphrase "router and (problem or issue)" may be interpreted as the word "router" that is in close proximity to the word "problem" or "issue." "Close proximity" may be defined as occurring in the same sentence or spoken within a certain time (e.g., two seconds) of each other. Other criteria and logical operators may be defined depending on the embodiment and/or circumstances.

Because the utility and appropriateness of a keyphrase is typically very specific to the circumstances of the call and the needs of the user, in many embodiments, the user identifies the keyphrases. For instance, the user may input one or more keyphrases using a syntax and logical selection criteria recognized by the IG 495 and these inputs may be saved by the IG 495 and used to search the word index table, the keyword table, and/or audio input data to identify occurrences of these keyphrases. In turn, a corresponding keyphrase mapping table 880 may be generated, such as the one shown in FIG. 8D. Depending on the embodiment, the keyphrase mapping table 880 may have a similar structure as the keyword mapping table 300, but typically the keyphrase mapping table 880 is generated by a different process.

In the example shown in FIG. 8D, the keyphrase mapping table 880 comprises a keyphrase column 882 and a time column 884. The entries in the table 880 include a first entry 886 for the phrase "Router+Problem|Issue," a second entry 887 for the phrase "Reboot+Router," and a third entry 889 for the phrase "Green+Light+On." Depending on the circumstances, not every keyphrase provided by a user will necessarily exist in the call. Thus, in particular embodiments, the MCVT 156 may provide feedback upon entry of a keyphrase that does not exist in the call as defined. For example, in one instance, the MCVT 156 may indicate for a particular keyphrase that the words are present in the call, but not in the proximity as indicated in the keyphrase.

Figure 9:
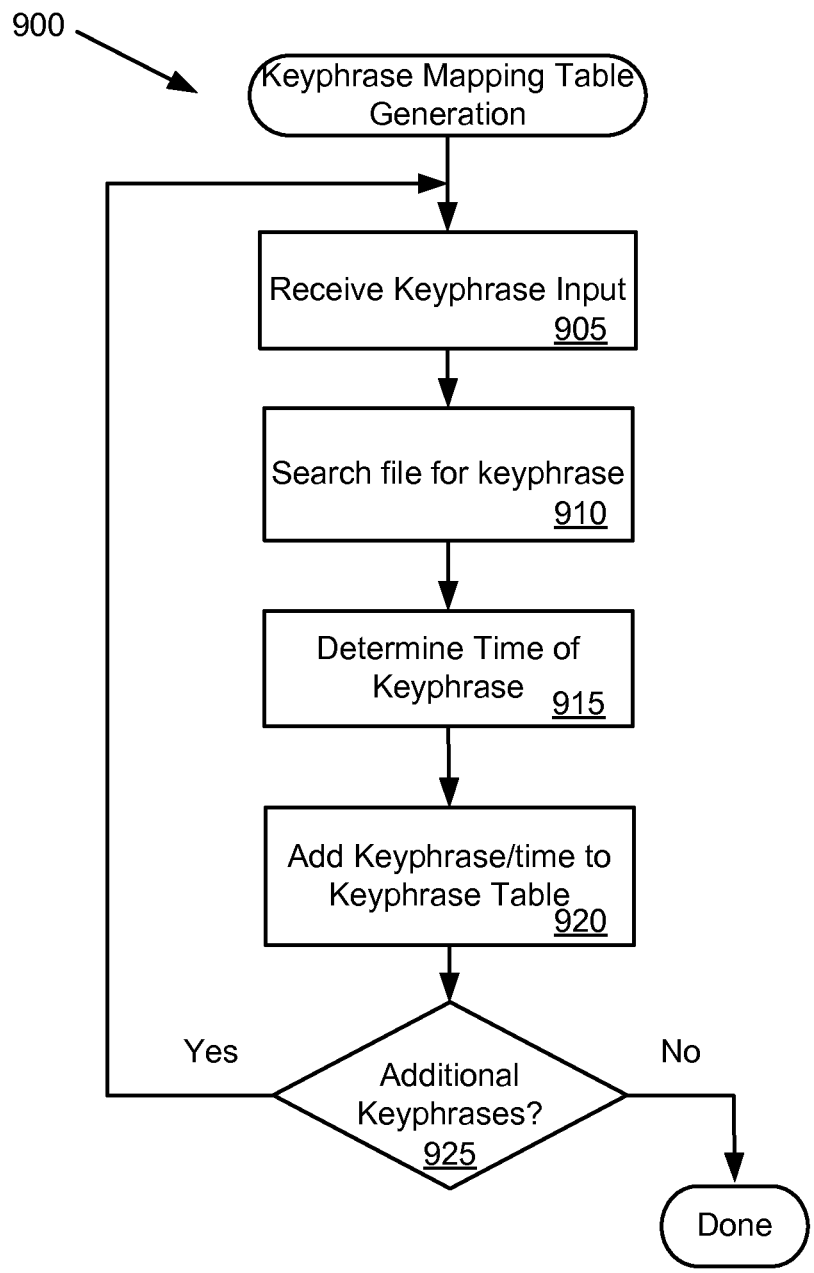
FIG. 9 shows a process flow for generating a keyphrase component mapping table in accordance with various embodiments of the present invention.

The process 900 for generating a keyphrase mapping table 880 according to various embodiments is shown in FIG. 9. The process 900 begins with receiving keyphrase input in operation 905. This input can be typed in by a user, accessed from a library of keyphrases, or developed by algorithms in the MCVT 156 for the particular contact center application. For example, contact centers over time may develop a useful library of keyphrases for identifying content of particular types of calls. Once the keyphrase input is received, a search is made for the keyphrase in operation 910. Depending on the embodiment, the search may be performed in different ways, either based on analyzing the audio data, the corresponding text, and/or the corresponding keywords. Presuming a search result is located, the time into the communication where the phrase first occurs is determined in operation 915. At this point, the keyphrase and its associated time are entered into the keyphrase mapping table 880 in operation 920. It is possible that an entry for the keyphrase may already exist, and if so, then the time where the keyphrase further occurs is noted in the keyphrase mapping table 880. If there are additional phrases in operation 925, then process 900 loops back to receive the next keyphrase input, otherwise the process 900 for generating the keyphrase mapping table 880 is completed.

In many instances, a special case occurs when a keyphrase is a single word. In theory, a keyphrase indicated by a user could be a single word and this single word may not have been identified as a keyword based on its infrequency of use during the call. In these instances, depending on the embodiment, the user could add the word to the keyword table if desired and review the results accordingly, or the user could merely indicate the word as a keyphrase and search for its occurrence in the call. Depending on the particular GUI provided to the user, one approach may be easier and quicker than the other.

It is noted that in various embodiments, the concept of mapping components for a communication can be framed in terms of "content objects." Generally speaking, a content object is content that a mapping module 440, 445, 450, 455, 460 is able to process into component form. For instance, in the example of speech, the individual spoken sounds can be viewed as content objects and the audio mapping module 440 may employ a speech recognition engine to process these content objects and identify the corresponding text-based word for each spoken sound. Ideally, a mapping module 440, 445, 450, 455, 460 is able to identify and distinguish each content object (e.g., each spoken sound) and to further recognize and map the corresponding component (e.g., recognize the word the sound corresponds to and map the word to a particular occurrence/time) for the communication. In practice, however, some content objects may be distinguished from other content objects; although the corresponding component is not recognizable. For example, some verbal sounds (e.g., a grunt and/or a yawn) may be distinguished by the audio mapping module 440, but are not recognizable as words.

Continuing on now, in the case of the video mapping module 445, in particular embodiments, this module 445 may simply produce mapped video to facilitate locating an appropriate time (e.g., a specific location) in the video. Thus, in these particular embodiments, the module 445 may not be configured to distinguish any content objects. However, in other embodiments, the video mapping module 445 may instead be configured to recognize content objects. For example, in particular embodiments, facial recognition software may be incorporated into the video mapping module 445 to distinguish human faces. In these instances, the content object is a human face and the facial recognition software distinguishes (e.g., identifies) different people that appear in the video at different times based on recognizing different human faces during these times. Thus, in particular embodiments, the software may be able to recognize that Individual #1 initially appears at the beginning of the video and then reappears at the end of the video. Although the identity of Individual #1 may not necessarily be known, Individual #1 can be distinguished from others that appear in the video and recognized when he reappears.

With that said, it is also possible that the video mapping module 445 could be configured to identify a particular human's face in some embodiments. For example, in particular embodiments, the module 445 may access a library of identified individuals' faces and use the library as a basis of comparison to individuals' faces detected in the video. Thus, in these instances, such capability would require the video mapping module 445 to be able to distinguish human faces in the video and to then compare a particular human face from the video against known references in the library. For example, in a work environment, a data file of employee photos may be available and the video mapping module 445 may distinguish a human face in a video and compare it against the library of employee photos to identify the particular employee associated with the human face in the video.

Further, in various embodiments, the video mapping module 445 may allow the user to select a distinguishable content object and search through the video for other appearances of the object. This may be referred to as either content object recognition or content object identification. For example, a user may view the video and freeze the video at a particular frame when Individual #1 is present. The user may use a stylus to select Individual #1's face and define that face as the focus of a search object. In turn, the video mapping module 445 may then use this input to search for all other instances of Individual #1's face in the video.

Finally, in various embodiments, the video mapping module 445 may be configured to compare various faces that appear in a video with a particular employee photo in a library that a user has selected. For example, the user may define a particular employee's photo in the library as the face to be searched for in the video. In turn, the video mapping module 445 then searches the video for instances where that employee's face is present.

Thus, in light of the above-described concepts, in various embodiments, the MCVT 156 may provide a user with a mechanism to define a content object in a video frame (e.g., a gun, car, dog, etc.) and request the video mapping module 445 to search and locate instances of where the content object appears in the video. Alternately, the MCVT 156 may allow the user to reference an existing image (e.g., an image of a type of car from a library) and request the video mapping module 445 to search for instances in the video that correlate to the existing image (e.g., the image of the type of car). Thus, depending on the embodiment, the MCVT 156 may be used for a variety of video applications to flag instances of a known content object in a video or to search the video to identify whether a particular content object appears at all in the video. This may have utility in searching for particular content that may appear in, for example, a surveillance video.

Further, in various embodiments, the above-described concepts could also be applied to other forms of mapping modules 440, 450, 455, 460, although the utility may vary depending on the embodiment. For instance, in many of the other applications, the component inputs are readily distinguishable and recognizable. For example, an information resource input may be a URL of a web site accessed by the agent. In this instance, the URL could be viewed as the content object and the URL is relatively easy to distinguish from other URLs since each URL has a unique alpha-numeric value. As a result, multiple occurrences of the URL may be easily searched and identified. Further, comparison of the URL with a list of reference URLs is also straightforward.

In addition, with regard to events, each of these may be considered as a content object. Typically an event is uniquely labeled as part of defining the input message for the particular event. For example, if events involve controlling a number of different electrical relays, then an event for controlling a particular relay may be distinguished by the message label for the input received for the event. Specifically, a message conveying "Relay_#1_opened" indicates an event in which Relay #1 was opened. Thus, in this instance, the user could request the MCVT 156 to identify whenever the "Relay_#1_opened" event (e.g., content object) occurred for a communication and the MCVT 156 could search a corresponding event mapping table to identify such instances.

Exemplary Communication Mapping Architecture

Figure 10:
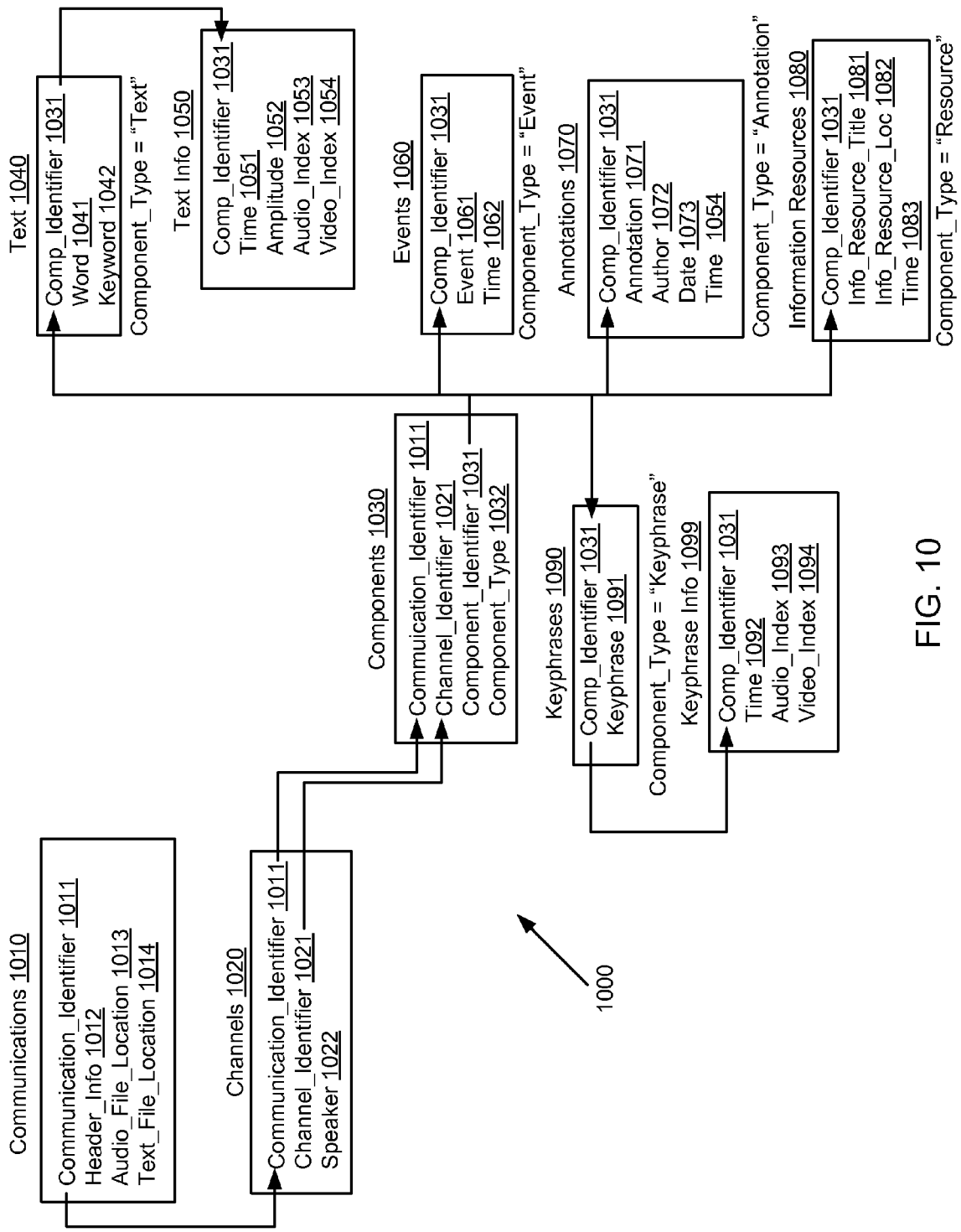
FIG. 10 shows a data architecture in accordance with various embodiments of the present invention.

In various embodiments, the MCVT 156 not only creates the various mapping tables as discussed above, but also correlates the various mapping tables for the same communication (e.g., call). FIG. 10 provides a data architecture 1000 for associating various data elements in accordance with an embodiment of the invention. Depending on the configuration, this particular architecture 1000 may be utilized as a file structure or a database structure. That is, for instance, the primary structures 1010, 1020, 1030, 1040, 1050, 1060, 1070, 1080, 1090, 1099 shown in FIG. 10 may be constructed as individual files or as individual tables depending on whether a file structure or a database structure is used.

The Communications mapping structure 1010 is configured to store primary information about the communication. For this particular embodiment, the Communications mapping structure 1010 includes a communication identifier (Communication_Identifier 1011) for each communication that uniquely identifies the particular communication. This identifier 1011 may be used to retrieve as well as associate other data structures to the communication. The Communication mapping structure 1010 may also include a Header_Info 1012 data element that provides general information about the communication, such as, for example, a date and time when the communication was initiated. Depending on the embodiment, the Header_Info 1012 may be separated out into multiple fields for storage purposes and may be stored as an identifier that is used to retrieve such formation from a different location (e.g., file or table). Further, the Communications mapping structure 1010 for this particular architecture 1000 may also store identifiers for a storage location (Audio_File_Location 1013) of the mapped audio data of the communication and one or more identifiers (Text_File_Location 1014) where the mapped text data for the communication is stored. Thus, these identifiers may be utilized to retrieve the appropriate audio and/or text files from storage. Depending on the embodiment, separate audio and/or text files may be generated for the agent and the remote party. While in other embodiments, a single audio file and/or a single text file may be generated for the communication.

The Channels mapping structure 1020 stores information on the various channels for a communication. For instance, in particular embodiments, the audio channel for the agent may be distinct from the audio channel for the remote party. For example, for a communication involving a caller who has contacted the contact center about a wireless router issue, the Channels mapping structure 1020 may identify a channel for the agent's speech and a channel for the caller's speech. For this particular embodiment, the Channels mapping structure 1020 includes the Communication_Identifier 1011 to identify a particular communication and a Channel_Identifier 1021 to identify a particular channel for the communication. Thus, in the example, the Channels mapping structure 1020 would include a first entry identifying the agent's channel and a second entry identifying the caller's channel. Further, in this particular embodiment, the Channels mapping structure 1020 includes an identifier (Speaker 1022) that identifies the party associated with channel (e.g., the agent or caller). For this particular configuration, the combination of the Communication_Identifier 1011 and the Channel_Identifier 1021 are unique within the Channels mapping structure 1020.

Continuing on, the Components mapping structure 1030 contains information about the various components that are identified for a communication. That is, in particular embodiments, the Components mapping structure 1030 identifies the mapped components (e.g., keywords, keyphrases, events, information resources, annotations, and/or any combination thereof) for a particular communication. This particular structure 1030 includes the Communication_Identifier 1011 and the Channel_Identifier 1021 for a particular communication and channel to allow for the identification of the communication and corresponding channel. The Components mapping structure 1030 further comprises a Component_Identifier 1031 for a particular component identified for the channel of the communication. Thus, the combination of the Communication_Identifier 1011, Channel_Identifier 1021, and Component_Identifier 1031 are unique within the structure 1030. In addition, the Components mapping structure 1030 includes a Component_Type 1032 that identifies the component type for each component, such as, for example, text, keyphrase, event, annotation, or information resource.

Further, the particular architecture 1000 shown in FIG. 10 includes component mapping structures 1040, 1050, 1060, 1070, 1080, 1090, 1099 for various component types. Beginning with the text components, the architecture 1000 includes a Text mapping structure 1040 to store the mapped text for the communication. As you may recall, in particular embodiments, each word spoken during a communication is mapped with respect to time. Thus, in this particular embodiment, the Text mapping structure 1040 includes a component identifier (Comp_Identifier 1031) for each word spoken for each channel of the communication. In addition, the Text mapping structure 1040 includes a data element (Word 1041) to store the particular word. Further, the Text mapping structure 1040 includes a data element (Keyword 1042) indicating whether the particular word has been identified as a keyword for the channel of the communication. For instance, in one embodiment, the Keyword data element 1042 may be configured to store a Boolean value of true or false.

In addition, the architecture 1000 includes a Text Info mapping structure 1050 that provides information on each occurrence of a word for a particular channel of a communication. For example, if an agent had spoken the word "router" twice during a particular communication, then the Text mapping structure 1040 would have an entry for the word "router" and the Text Info mapping structure 1050 would have an entry for each occurrence of the word "router" that was spoken by the agent. That is, the Text Info mapping structure 1050 would have two entries for the word "router."

For this particular mapping structure 1050, the structure 1050 includes the component identifier (Comp_Identifier 1031) and a field (Time 1051) containing the time of occurrence for the particular instance of the word being spoken for the particular channel of the communication. As is described further below, this Time 1051 may also be used in particular embodiments to identify where the component is to be placed on a representation of the communication channel shown on a GUI. In addition, the Text Info mapping structure 1050 includes the Amplitude 1052 detected for the occurrence of the word. In particular embodiments, this information is used by the IG 495 to construct the waveform of the communication so that the waveform may be displayed on the interface to represent the speech component 200 (e.g., the audio) of the communication. Finally, for this particular embodiment, the Text Info mapping structure 1050 includes an Audio_Index 1053 and a Video_Index 1054 (if applicable) to indicate the location of the occurrence of the word in the audio and/or video files for the communication.

Continuing on, the architecture 1000 shown in FIG. 10 includes an Events mapping structure 1060 for mapping the events that occurred for a particular channel of a communication, an Annotations mapping structure 1070 for mapping the annotations added to a particular channel of a communication, and an Information Resources mapping structure 1080 for mapping the information resources utilized by the agent during the communication. In this embodiment, the Events mapping structure 1060 includes the identifier for the particular event component (Comp_Identifier 1031), the event that occurred (Event 1061), and the time of occurrence for the event (Time 1062). Likewise, the Annotations mapping structure 1070 includes the component identifier for the particular annotation (Comp_Identifier 1031), the annotation placed in the communication (Annotation 1071), the party that provided the annotation (Author 1072), and the date and time the annotation was added to the communication (Date 1073 and Time 1074). Further, the Information Resources structure 1080 includes the component identifier (Comp_Identifier 1031) for the particular information resource, a title of the resource (Info_Resource_Title 1081), a storage location for the resource (Info_Resource_Loc 1082), and the time during the communication when the resource was utilized (Time 1083).

Finally, the embodiment of the data architecture 1000 shown in FIG. 10 includes a Keyphrases mapping structure 1090 for mapping keyphrases identified for the communication. In this instance, the Keyphrases mapping structure 1090 includes the identifier for the particular keyphrase (Comp_Identifier 1031) and a data element (Keyphrase 1091) for storing the actual keyphrase. Since a keyphrase may appear multiple times in a communication similar to text components, the architecture 1000 also includes a Keyphrase Info mapping structure 1099 for storing information on each occurrence of a keyphrase for a particular channel of a communication. Thus, in this instance, the Keyphrase Info mapping structure 1099 includes the identifier for the particular keyphrase (Comp_Identifier 1031), the time of occurrence for the keyphrase (Time 1092) for the particular instance, and an Audio_Index 1093 and a Video_Index 1094 (if applicable) to indicate the location of the occurrence of the keyphrase in the corresponding audio and/or video files.

It should be noted that for this embodiment of the architecture 1000, the mapping structure for a particular component is identified by the type of component (Component_Type 1032) stored in the Components mapping structure 1030 for the particular component. For instance, if an event entry is placed in the Components mapping structure 1030 for an occurrence of an event for a particular channel of a communication, then the Component_Type 1032 is set to "Event" for the event entry. Thus, as a result, the associated mapping structure for the event can be identified as the Events mapping structure 1060 based on the Component_Type 1032 being set to "Event." That is, for this particular component entry, the entry can be identified as an event and the corresponding information for the event can be identified to exist in the Events mapping structure 1060 based on the Component_Type 1032 being set to "Event."

Figure 11:
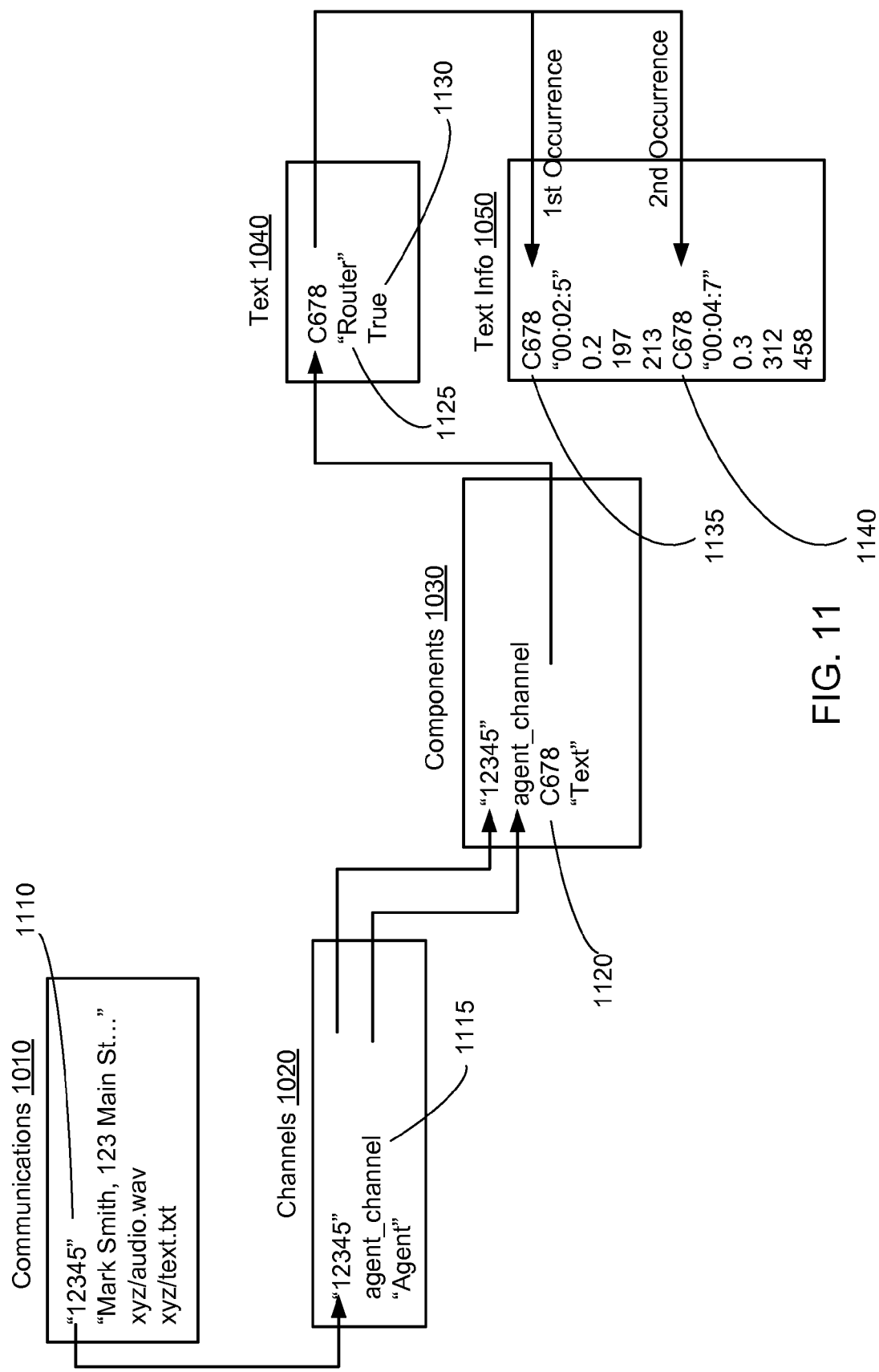
FIG. 11 shows a particular data architecture in accordance with various embodiments of the present invention.

A particular example with respect to the data architecture 1000 shown in FIG. 10 may help to further illustrate the mapping of a particular component of a communication. Turning to FIG. 11, the Communications mapping structure 1010 references a communication identified as "12345" (Communication_Identifier) 1110. This particular communication 1110 has a channel for the agent 1115 mapped to the communication in the Channels mapping structure 1020 and this channel 1115 has a particular component referenced as "C678" 1120 mapped for the channel in the Components mapping structure 1030. In this example, the particular component 1120 is identified as a "Text" component. Thus, to identify the specific mapping for the component, an entry is found in the Text mapping structure 1040. Specifically, the Text mapping structure 1040 indicates the particular component 1120 is the word "Router" 1125 and that this word has been identified as a keyword (e.g., the Keyword value 1130 is set to "True"). Thus, continuing on, the particular component 1120 is shown to have two occurrences for the agent's channel 1115 of the communication 1110 in the Text Info mapping structure 1050. The first occurrence 1135 is at "00:02:5" and the second occurrence 1140 is at "00:04:7." Accordingly, these values may be used to identify the location where the keyword "router" should be placed on a representation of the agent's channel of the communication provided on a GUI based on the two occurrences 1135, 1140 of the keyword as well as where the keyword can be found in the mapped speech and/or mapped text data for the communication.

Interface Generation Module

Figure 12:
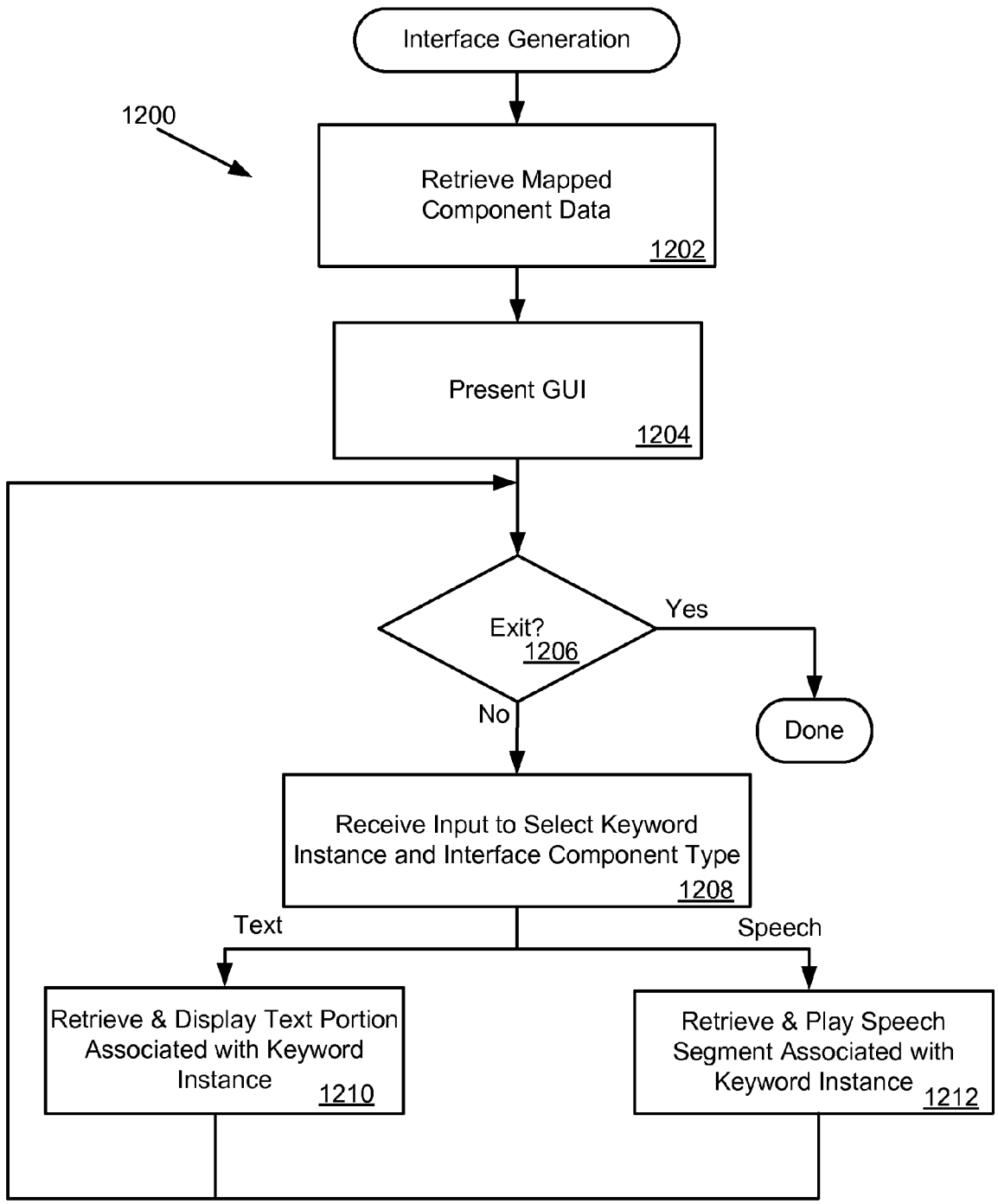
FIG. 12 shows a process flow for generating a graphical user interface for a user using a multi-component viewing tool in accordance with various embodiments of the present invention.

According to various embodiments, an IG module interacts with a user and processes the various mapped components for a communication (to the extent the corresponding inputs were previously mapped, or performs the component input mapping in real-time) to present the information for the communication to the user in a format that facilitates performing the SLR functions on the content and/or events associated with the communication. A high level process of such an IG module according to particular embodiments is shown in FIG. 12. This process 1200 begins by retrieving the various mapped component data in operation 1202. In this particular instance, it is presumed that the various component mappings have already occurred. That is, for instance, in the case of stored audio, the audio has already been processed to produce the mapped speech 464, mapped text 465, and/or keywords 470. However, in other instances, the native input may be stored and may need to be mapped to generate the mapped component data that is then processed by the IG module.

In particular embodiments, the mapped component data for a communication may include a speech component along with corresponding mapped text and keywords. Other embodiments may incorporate other components such as, for instance, information resources components. Still other embodiments may not necessarily include the speech component, but may include other component types. After the appropriate components for a communication have been identified and retrieved, an initial presentation of the data on a GUI in conjunction with a timeline is performed in operation 1204. The format of the GUI can vary depending on the embodiment, and one embodiment for presenting the information is discussed in more detail below.

After retrieving the appropriate components and presenting an initial representation of the mapped component data to the user, the IG module then waits for user input with respect to performing one of the SLR functions or exiting the GUI. Depending on the embodiment, searching for content can be done in various forms. For instance, manual searching may involve the user scrolling along the timeline using scroll buttons and viewing the icons for various components indicated at corresponding times on the timeline. While automated searching may involve the user selecting a keyword or keyphrase and having the IG module ascertain the first location of the selected input and updating the GUI to display the relevant portion of the timeline. Typically, the IG module automatically scrolls the display along the timeline to display the located keyword or keyphrase. In particular instances, the IG module may further highlight or otherwise distinguish the relevant icon corresponding to the search result.

In particular embodiments, the review function involves the user reviewing the mapped input data. For instance, this may involve the user reviewing the speech or the text associated with a particular keyword. Different icons may be used to indicate the speech and the text and the user may select the appropriate icon as desired to review the appropriate mapped input data. For example, once the user has selected a particular icon, then the appropriate portion of the speech or the text associated with the corresponding keyword is presented to the user on the GUI.

Thus, returning to FIG. 12, if a determination is made not to exit in operation 1206 and the input received in operation 1208 is for text (e.g., the user has requested to review the text containing the keyword), then the IG module retrieves the text in the vicinity of the occurrence of the indicated keyword and displays the text to the user in operation 1210. Typically, a set amount of text before and after the occurrence of the keyword is presented to allow the user to ascertain the context of the keyword in the communication. In particular embodiments, the user can further scroll forward and backward to ascertain additional context if desired. If instead the input at operation 1208 is for speech, the IG module then retrieves the corresponding portion of the audio from the communication and plays it for the user in operation 1212. In various embodiments, the audio played may include a brief time before the usage of the keyword and extend for a brief time beyond the usage. The user can also indicate to hear a greater portion of the audio context by starting at an earlier point in time to hear the audio. Once completed, the IG module then waits for the user to provide another input by looping back to operations 1206 and 1208. At this point, the user performs another SLR function or eventually exits out of the GUI and the process 1200 is completed.

Example Application

An example is now provided that is used throughout this disclosure to demonstrate various aspects of embodiments of the invention. This example is provided to help facilitate the reader's comprehension of these aspects of the concepts and technologies and should not be viewed as limiting the scope of the invention.

In the example, a caller has contacted a contact center about an issue with a wireless router. In this instance, the contact center is providing technical support for the manufacturer of the wireless router. The caller is initially greeted by an interactive voice response system (IVR 135) that inquires about the reason the caller is contacting the contact center. The IVR 135 may further notify the caller that the call may be recorded for quality assurance purposes. The caller identifies via the IVR 135 that he is having an issue with his wireless router and the caller is routed to a contact center agent for assistance.

The agent greets the caller and asks the caller for the model number of the router and what specific issue the caller is having with the router. The caller answers that the router model is A123 and explains that he recently purchased a new smart phone and the phone cannot seem to find the wireless network associated with the router.

At this point, the agent uses his workstation to retrieve a list of recommendations for the caller to try to resolve his issue. This list of recommendations is provided in a document displayed on the agent's workstation and is considered an information resource utilized by the agent while fielding the call. The first recommendation is to have the agent ask the caller to check to make sure the router is working properly. Thus, the agent asks the caller to check to see if the wireless light, the Internet port light, and the LAN light are all illuminated and green. The caller checks the three lights and responds that they are lit and green. The agent answers "okay, the router appears to be working correctly."

The second recommendation is to check to see whether the wireless network may be receiving interference from another device such as a microwave or a cordless phone. The agent asks the caller if such a device is in close proximity to the wireless router and if so can the caller turn off or unplug the device. The caller answers that the only close device is the cordless phone that he is currently using to talk with the agent and this device is normally located in a different room than the room with the wireless router. The agent asks the caller to leave the room and see whether his new smart phone can now detect the wireless network. The caller informs the agent that the phone still cannot detect the network.

Next, the agent has the caller change the router settings to use a different wireless channel. To help the caller to accomplish this task, the agent retrieves another document (i.e., a second information resource) to his workstation that provides instructions on how to change the router settings to use a different wireless channel. The agent then leads the caller through the instructions steps. Once changed, the caller answers that the phone still cannot detect the wireless network. Accordingly, the agent answers "okay, the network does not appear to be receiving interference from another device."

The third recommendation is to check to see whether the router is too busy to respond to a new request from the smart phone. The agent asks the caller to disconnect another device from the wireless network to see if his new phone can then see the network. The caller disconnects his laptop computer from the wireless network and informs the agent that his phone still cannot see the wireless network. The agent answers "okay, the router does not appear to be too busy to respond to a request from the phone."

Finally, the fourth recommendation is to check to see whether the network is set up to broadcast its network name (SSID). The agent asks the caller to attempt to manually connect his new phone to the wireless network. This process entails the caller manually typing in the network information on his new smart phone to attempt to connect to the network. The agent calls up yet another document (i.e., a third information resource) on his workstation that provides instructions to perform this process and guides the caller through the appropriate steps. However, the smart phone is still unable to connect to the wireless network. Accordingly, the agent responds "okay, it does not appear to be a problem related to the network broadcasting its network name."

At this point, the agent has tried all of the recommendations provided on the list to attempt to resolve the caller's issue with his wireless router. The agent informs the caller that he is going to forward the caller to an expert on wireless routers in their technical support group. The agent forwards the call to the expert. The expert receives the forwarded call and is curious about what measures have been taken so far to attempt to address the caller's issue and would like to view a summary of the conversation that has taken place thus far between the caller and the agent. Accordingly, as is discussed further below, various embodiments of the invention provide an interface so that the expert can view such a summary.

Summary of Mapping Module Processes

At this point, the expert may invoke the MCVT 156 to view what measures have been taken so far to attempt to address the caller's issue and to view a summary of the communication that has taken place thus far between the caller and the agent. It can be assumed that the MCVT 156 received audio input for the call between the caller and the agent.

Accordingly, the MCVT 156 generates the appropriate entries for the data structures shown in FIG. 10 for the communication. For instance, the audio mapping module 440 processes the audio input through the speech analytics engine (either in real-time or non real-time) to generate a list of the words that were recognized during the call up to the point of transfer. In addition, a word index table is generated that identifies all the words spoken during the call and their relative frequency for the call. This index table is further processed to generate a keyword table comprising a subset of the useful words that were frequently used during the call. In this instance, both the word index table and the keyword table include the times when the words were observed to occur in the communication.

Next, the MCVT 156, or more specifically the IG module, generates a GUI for the user (e.g., the expert to whom the call has been forwarded to). In particular embodiments, the GUI may display a timeline with the appropriate placement of the keywords as indicated by icons at the appropriate times.

Exemplary Graphical User Interface

Figure 13:
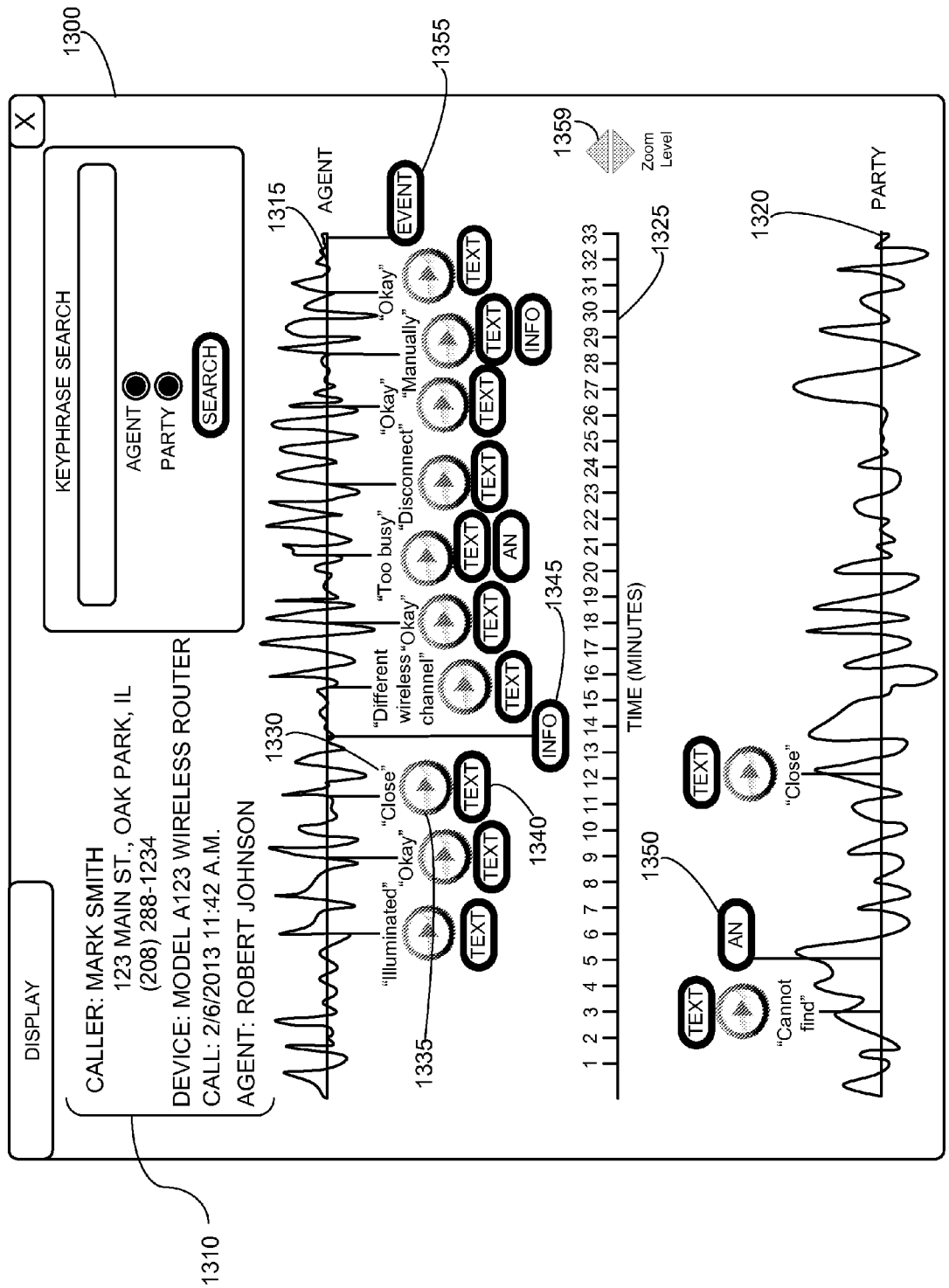
FIGS. 13-24 show a graphical user interface for a multi-component viewing tool in accordance with various embodiments of the present invention.

An embodiment of a GUI 1300 provided for a communication is shown in FIG. 13. This particular embodiment shows the GUI 1300 generated for the communication conducted between the caller and the agent to discuss the caller's issue with his wireless router. The upper-left portion of the GUI 1300 provides information 1310 about the particular communication. In this instance, the caller is identified as Mark Smith, who resides at 123 Main St., Oak Park, Ill. Further, the information 1310 indicates the communication involves an issue with a Model A123 wireless router and the call was received on February $6^{th}$ at 11:42 a.m. Finally, the information 1310 indicates the agent involved in the communication was Robert Johnson.

In this instance, the GUI 1300 provides a representation 1315 of the agent's speech component, e.g., the agent's communication channel, and a representation 1320 of the caller's speech component, e.g., the caller's communication channel. Between the two representations 1315, 1320, a timeline 1325 is provided indicating the minutes into the communication. Further, icons for the components associated with each communication channel are mapped out along the corresponding representation 1315, 1320. Controls 1359 can be used to increase or decrease the viewing scale of the overall timeline and representations 1315, 1320. This may be useful if the number of icons displayed appears very crowded.

In this instance, the representation 1315 of the agent's communication channel shows that the keyword "close" 1330 was spoken by the agent around eleven minutes into the conversation. Recall that the agent had checked to see whether the wireless network provided by the caller's router was close to another device such as a microwave or cordless phone and thus receiving interference. At that time, the agent asked the caller if any such device was in "close proximity to the wireless router." Thus, the keyword "close" was identified and indicated as associated with the agent's speech component. Since this keyword was spoken during the conversation, the keyword "close" 1330 is identified on the GUI 1300 for the agent's channel.

If the expert is interested in listening to the audio between the agent and the caller with respect to this particular instance of the keyword 1330, then the expert may select the audio play icon 1335 to listen to that particular portion of the audio. In this particular embodiment, the icon 1335 is located in proximity to the keyword 1330 and selecting the icon 1335 causes the portion of the audio communication associated with that instance of the keyword 1330 to be played. Likewise, if the expert would like to view the transcript of text with respect to this particular keyword 1330, then the expert may select the "TEXT" icon 1340 to view the transcript associated with this instance of the keyword 1330. Accordingly, in various embodiments, the MCVT 156 uses the mapped speech 464 and/or mapped text 465 of the communication to access the audio and/or text for the communication at the point at which the selected keyword 1330 occurs.

In similar fashion, if the expert is interested in reviewing the information resources used by the agent during the communication, then the expert may select the corresponding icon for the particular information resource component. For instance, during the communication, the agent retrieved various documents at his workstation, including one that provided instructions on guiding the agent through the process for changing the router settings to use a different wireless channel. Thus, if the expert is interested in viewing this document, then the expert may select the appropriate information resource icon 1345 on the interface 1300. This results in opening a new window for viewing the corresponding information resource.

Further, in various embodiments, the GUI 1300 is configured so that annotations may be added for a particular communication. As mentioned, annotations allow a user to add comments that may be later referenced by another user who is reviewing the communication. For instance, in FIG. 13, an icon 1350 is provided for an annotation that has been added to the representation 1320 associated with the caller's communication channel at around the five minute mark in the conversation.

Finally, if the expert is interested in reviewing the events associated with the communication, then the expert may select the appropriate icon for a particular event to do so. For instance, the representation 1315 of the agent's communication channel displays an icon 1355 for an event that occurred near the conclusion of the conversation between the agent and the caller. Thus, if the expert is interested in viewing what event occurred near the conclusion of the conversation between the agent and the caller, then the agent would select this icon 1355 to view the details for the event. Although not displayed on the GUI 1300 shown in FIG. 13, similar types of icons may be provided for video components as well.

Figure 14:
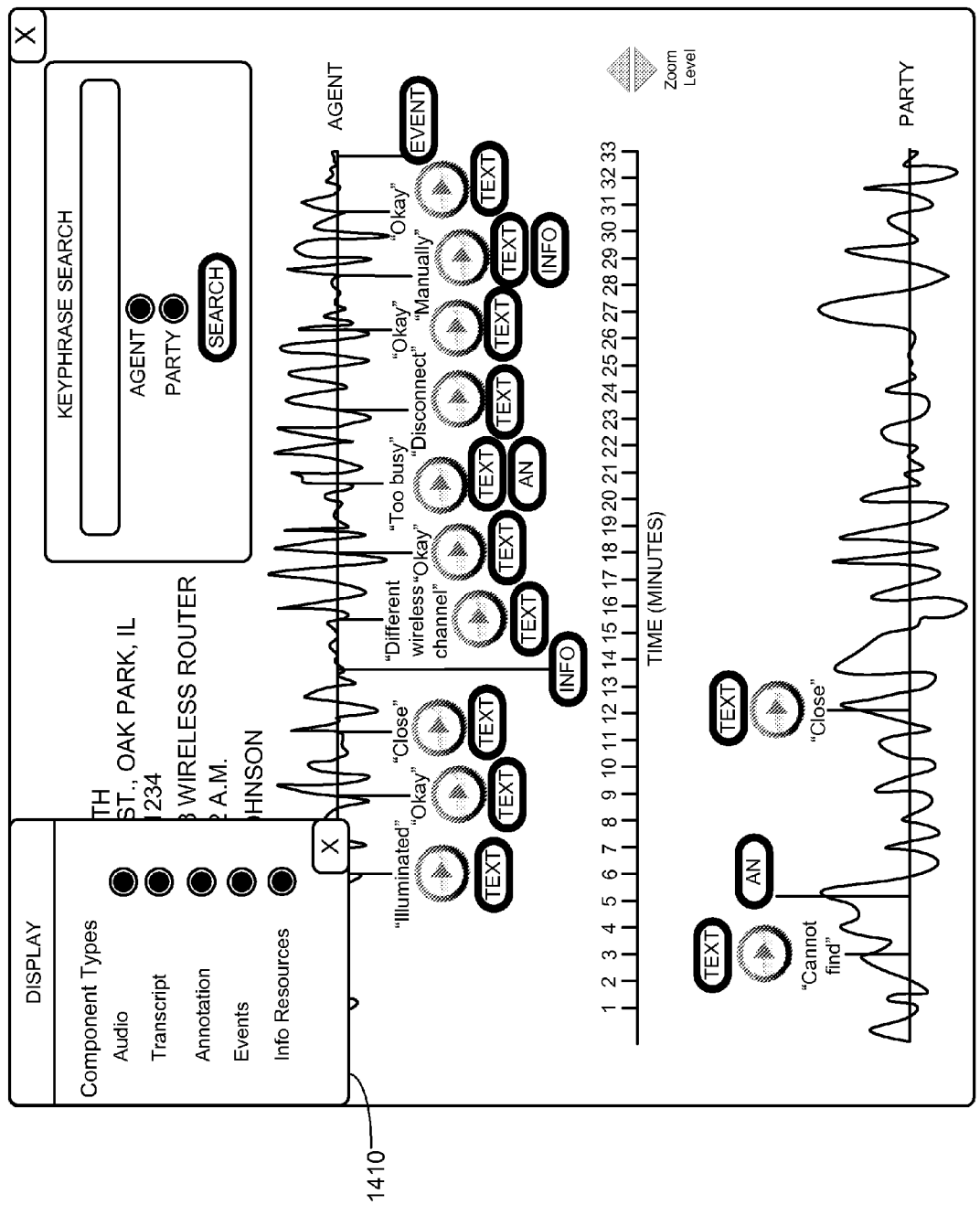

Turning now to FIG. 14, in particular embodiments, the GUI 1300 may be configured to allow a user to select the component types to be displayed on the GUI 1300. For instance, if a user is only interested in viewing the keywords with associated audio and text components, then the user may indicate only to display icons for these components. Thus, for the embodiment shown in FIG. 14, a dropdown menu 1410 is provided allowing the user to indicate which components should be displayed on the GUI 1300. In this instance, all five types of components have been selected.

Figure 15:
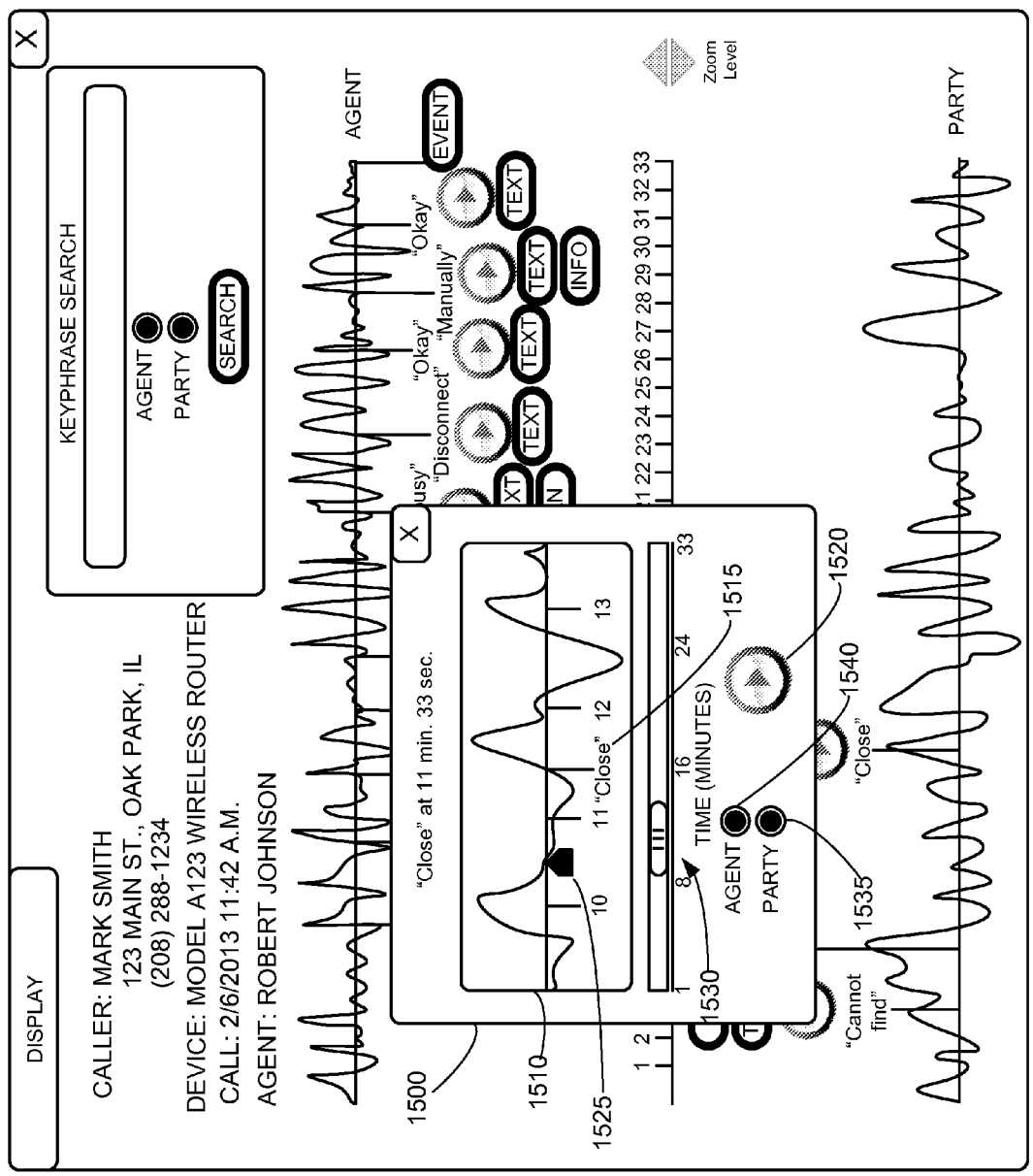

FIG. 15 provides a popup window display for a particular keyword in which the audio play icon 1335 has been selected. In this instance, the GUI 1300 provides a popup screen 1500 displaying a portion 1510 of the communication proximate to the selected keyword 1515. For this particular embodiment, the screen 1500 provides an icon in the shape of a play button 1520 and a sliding mechanism 1525 so that the expert may move along the portion 1510 of the communication and listen to the audio for the communication with respect to the position indicated by the sliding mechanism 1525. This allows the expert to listen to the actual conversation between the agent and the caller to better understand what actually transpired during the conversation. Further, for this particular embodiment of the popup screen 1500, the expert is provided with a second sliding mechanism 1530 that allows the expert to move to a different portion of the communication and is provided with selectors 1535, 1540 to identify which channels of the communication the expert would like to listen to.

Figure 16:
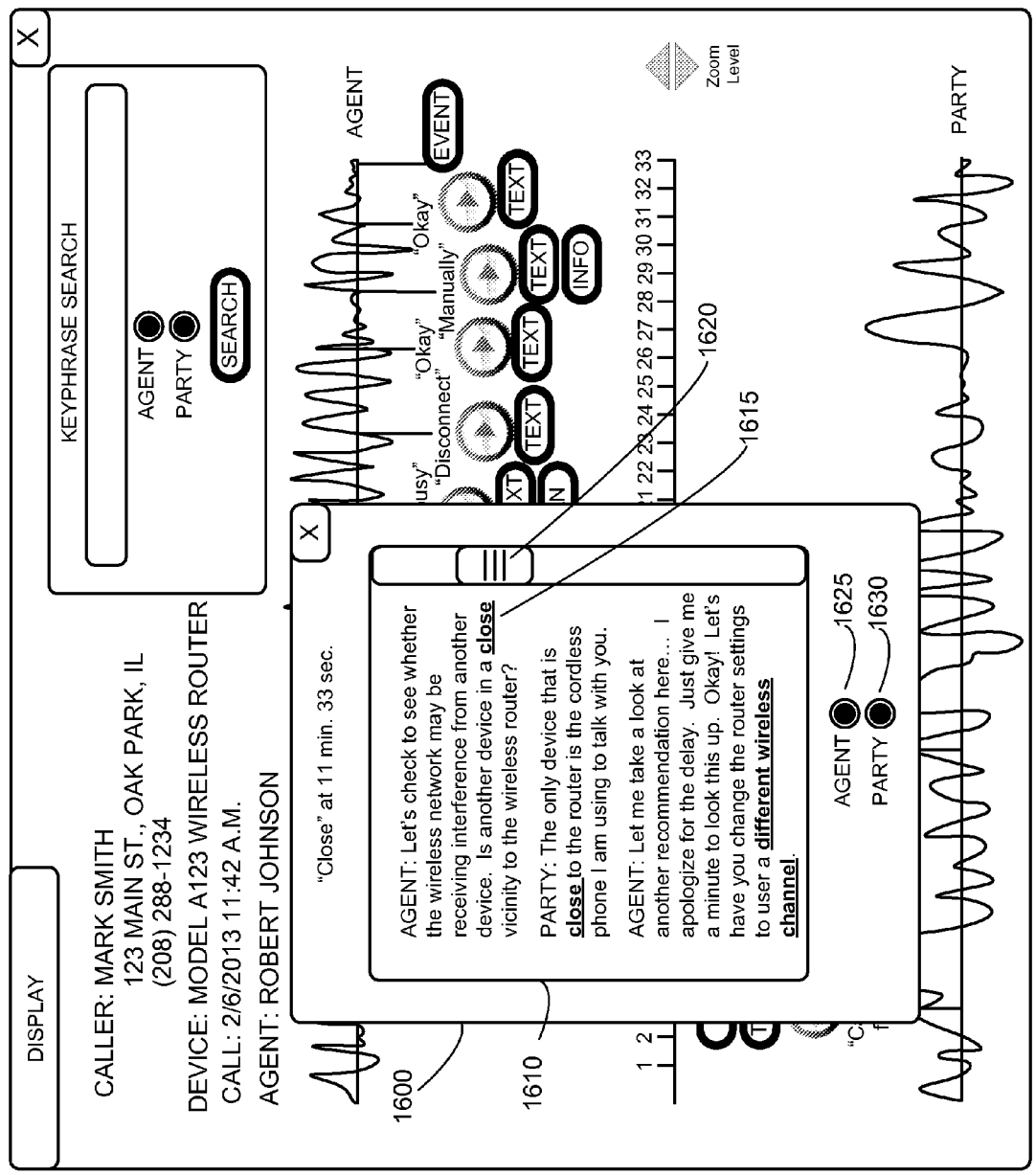

Likewise, FIG. 16 provides a popup display for a particular keyword in which the text icon 1340 has been selected. Similar to the audio popup screen 1500, the popup screen 1600 for the text component provides a portion 1610 of the transcript of the communication proximate to the selected keyword 1615. Thus, by selecting an icon 1340 for the appropriate text component on the GUI 1300, the corresponding text files for the communication are accessed based on the mapping saved for the communication and the text is displayed on the popup screen 1600. In this instance, the keywords appearing in the text are bolded and underlined. For the embodiment shown in FIG. 16, the expert is similarly provided with a sliding mechanism 1620 so that the expert may move to other portions of the transcript if desired. In other embodiments, icons can be provided in the popup window (not shown) to jump to the next occurrence of the keyword or to the previous occurrence of the keyword. In addition, the transcript can be filtered to only display text for the agent, the caller, or both by selecting the appropriate selectors 1625, 1630.

Figure 17:
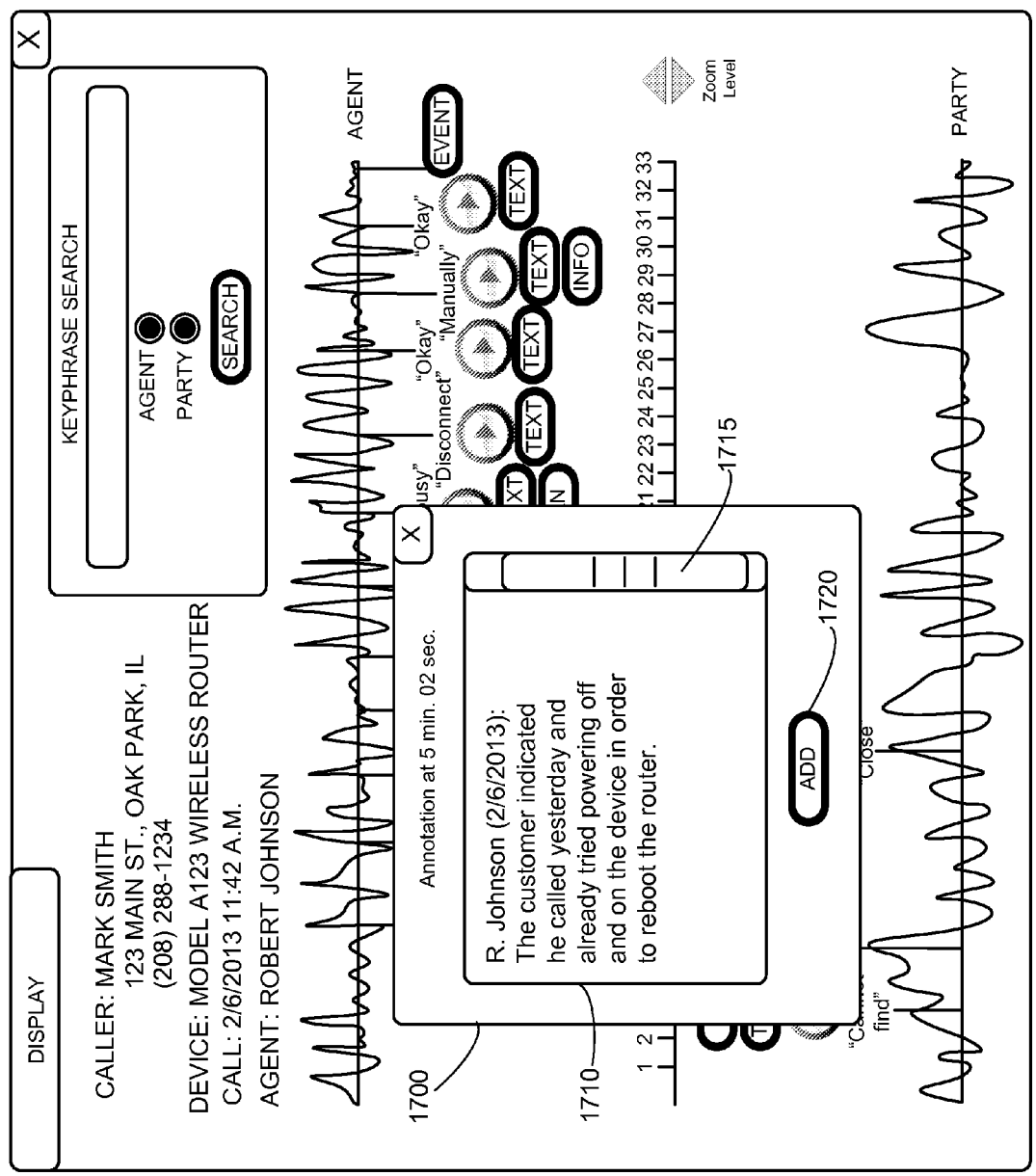

FIG. 17 provides a popup display for an annotation that has been selected. In this instance, the popup screen 1700 lists an annotation 1710 entered by the agent (R. Johnson) on Feb. 6, 2013. The annotation 1710 indicates that the caller (e.g., the customer) called yesterday and has already attempted to address his issue with the wireless router by powering the router off and on to reboot the router. The expert may find such information helpful with respect to other suggestions he may consider in addressing the caller's issue. Similar to the previous popup screens, this screen 1700 provides a sliding mechanism 1715 so that the expert may view further annotations that may have been added. In addition, the popup screen 1700 provides a button 1720 to add an additional annotation to the communication.

Figure 18:
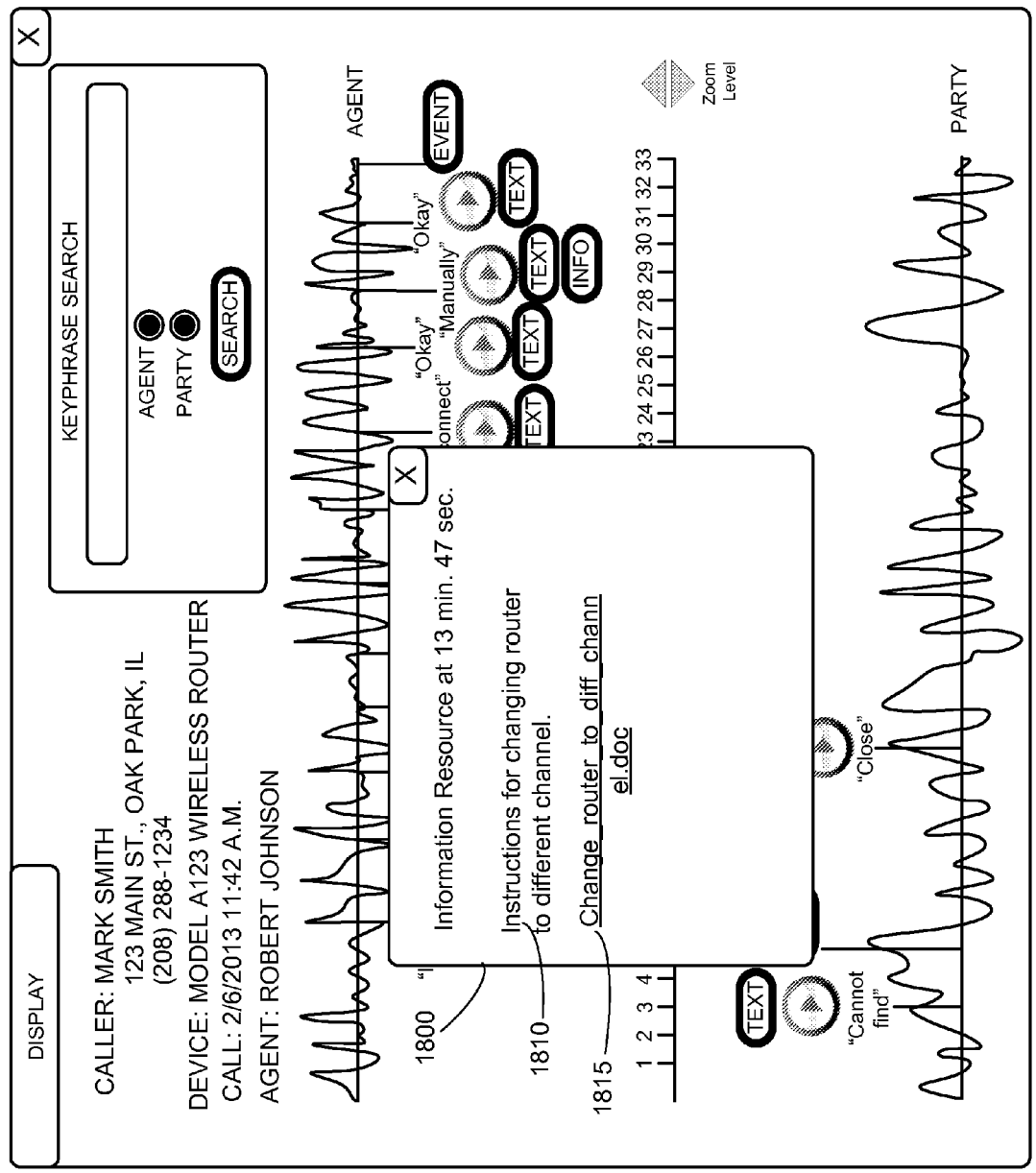

FIG. 18 displays an information resource used by the agent in fielding the communication received from the caller. In this instance, the popup screen 1800 provides a title 1810 of the resource used by the agent and a link 1815 so that the expert can retrieve the resource if desired. Depending on the circumstances, the information resource utilized by an agent during a communication may not necessarily be a document. For example, in some instances, the agent may utilize information found on a web site and the link 1815 provided on the popup screen 1800 may be to the web site. In other instances, the agent may utilize another resource such as another agent at the contact center or a third-party outside of the contact center. Thus, in these instances, the popup screen 1800 may indicate the individual resources used by agent and what information was conveyed by these resources. Those skilled in the art can readily identify various types and forms of resources that could be documented as being utilized by the agent during the call.

Figure 19:
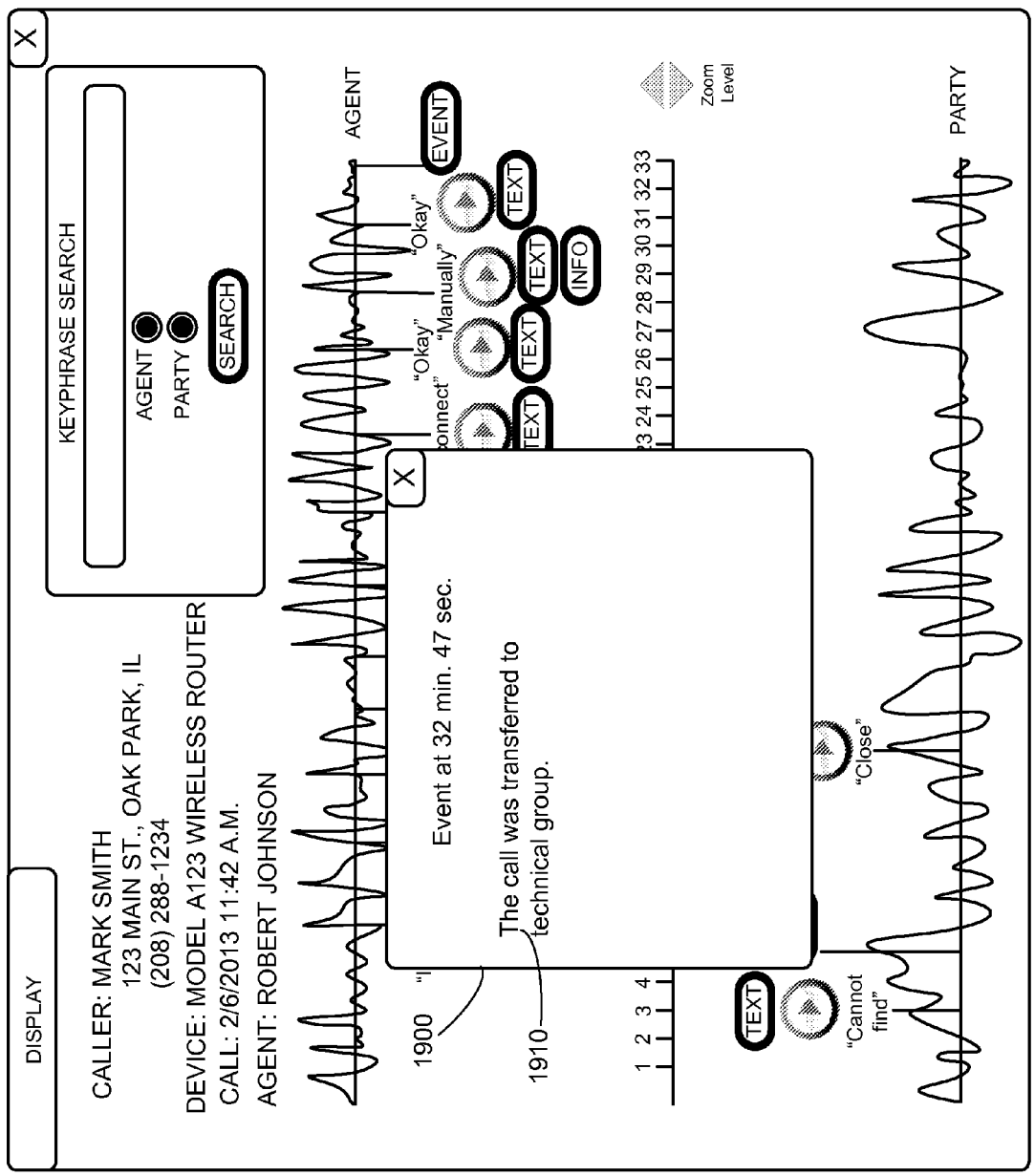

Finally, FIG. 19 displays an event that occurred during the call between the agent and the caller. In this instance, the popup screen 1900 provides the particular event 1910 that occurred near the end of the conversation between the agent and the caller around the thirty-three minute mark of the conversation. That event 1910 being the transfer of the call to the expert.

Keyphrase Search

Figure 20:
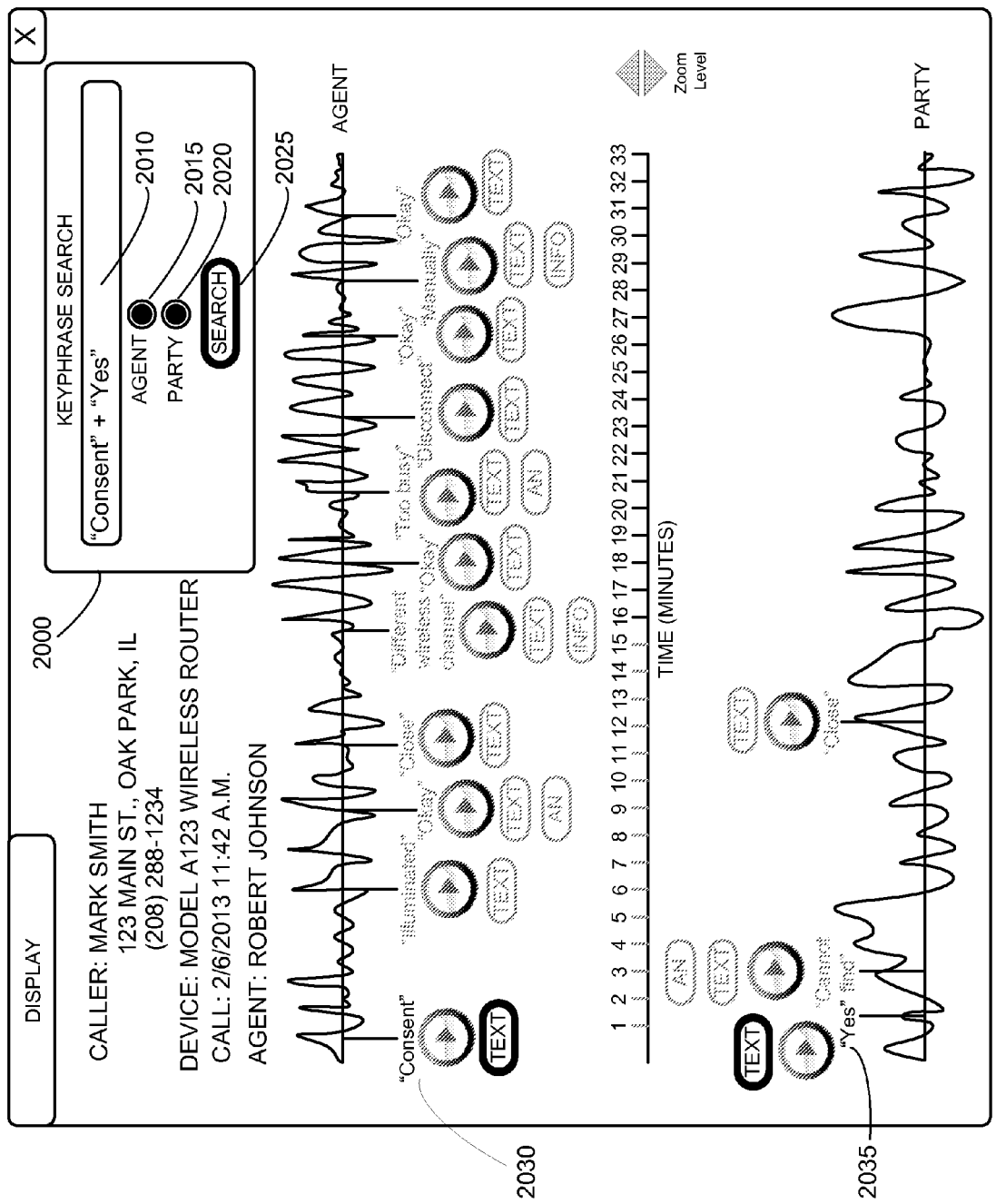

Turning now to FIG. 20, the GUI 1300 reflects the ability to receive and act upon one or more keyphrases provided by a user. To help describe this functionality, an example is used in which the expert who is now fielding the communication from the caller with the wireless router issue is interested in determining whether the agent obtained consent from the caller to record the communication. In particular, the expert would like to know this information before helping the caller so that the expert may also record the conversation with the caller if consent has been given. For this embodiment, the GUI 1300 provides a section 2000 in which the expert may enter the keyphrases to be searched. Thus, returning to the example, the expert enters the keyphrases "Consent" and "Okay" in the field 2010 provided on the section 2000 of the GUI 1300. For this particular embodiment, the GUI 1300 is configured so that a keyphrase is entered by placing quotes around the phrase. Thus, a keyphrase containing multiple characters (e.g., words and/or numbers) would have quotes around the multiple characters to indicate the entire combination of characters that should be searched in the communication. In addition, the GUI 1300 may be configured so that keyphrases may be used in conjunction with various logical operators.

Further, the section 2000 of the GUI 1300 provides indicators 2015, 2020 for each of the parties involved in the communication (e.g., the agent and the caller). Thus, for this particular embodiment, the expert may indicate that only the agent's channel, only the caller's channel, or both channels should be searched for occurrences of the keyphrases. Once the keyphrases have been entered and the indicators 2015, 2020 have been marked appropriately, the expert may select the "SEARCH" button 2025 to have a search conducted and the GUI 1300 updated accordingly. As a result, the GUI 1300 now displays an occurrence of the keyphrase "Consent" 2030 spoken by the agent and an occurrence of the keyphrase "Yes" 2035 spoken by the caller. At this point, the expert may listen to the audio and/or review the transcript in the text to ensure that consent was received by the caller for recording the communication. In various embodiments, the located icons may be distinguished from the other icons by hiding the non-selected icons, or using a different highlight, color, or other visual attribute.

Additional User Functions

The above discussion illustrates some of the functions that the user can perform by interacting with the MCVT 156. Depending on the embodiment, other functions may be invoked by the user, some of which are described below.

Zoom.

For this particular function, the user can select to zoom in or out of the timeline. The zoom level can be implemented as a slider, menu option, or other tool allowing the user to alter the scale of the view. This allows the user to see the entire communication timeline or focus on a portion of it. For example, if the timeline is condensed in some instances and there are many components involved, the display can become quite crowded with icons and this can make it difficult to discern what icons are present. Zooming in to view a smaller portion of the overall communication timeline can facilitate viewing and selecting individual icons in these instances.

Scroll.

This function enables a user to move the current location shown on the timeline by scrolling forward or backward in time. This allows the user to see the various component icons as they are placed relative to the timeline without changing the scale. Various tools can be defined for the user to manually scroll or to indicate a particular time and jump to that location on the timeline.

Keyphrase Logical Operators.

As describe above, in various embodiments, a user may opt to define a keyphrase that can be searched. This may allow the user to hone in on a particular portion of a call that addressed a particular subject. While in particular embodiments, the user may input a keyphrase manually, in other embodiments, the user may select keyphrases from a library or a list of commonly used phrases as determined by others. Thus, in particular embodiments, the MCVT 156 may retrain a history of commonly used keyphrases.

Further, in various embodiments, various syntax and logical operators can be defined to facilitate defining keyphrases. For instance, in particular embodiments, various logical operators may be defined and used by a user to specify proximity of one word to another for a keyphrase. For example, logical operators may be defined to require that two particular words must appear within five seconds of being spoken from each other to identify an occurrence of a particular keyphrase. One skilled in the art can define variations of keyphrase logical operators in light of this disclosure.

Editing Keywords.

Recall that in particular embodiments, keywords are derived from a word index table listing the words used in the communication and that the keywords comprise a subset of the most frequently occurring words from the word index table. In some instances, a threshold level may define a cutoff frequency level and this determines how large the keyword set is. In particular instances, the keyword set may be too large and the user may choose to manually delete certain keywords or the keyword set may be too small and the user may choose to add words to the keyword set by adjusting the threshold level. In other instances, the user may choose to manually add words to the keyword set. Thus, in various embodiments, various tools can be defined to allow the user to edit the contents of the keyword set and to adjust the criteria upon which the keyword set is created.

Figure 21:
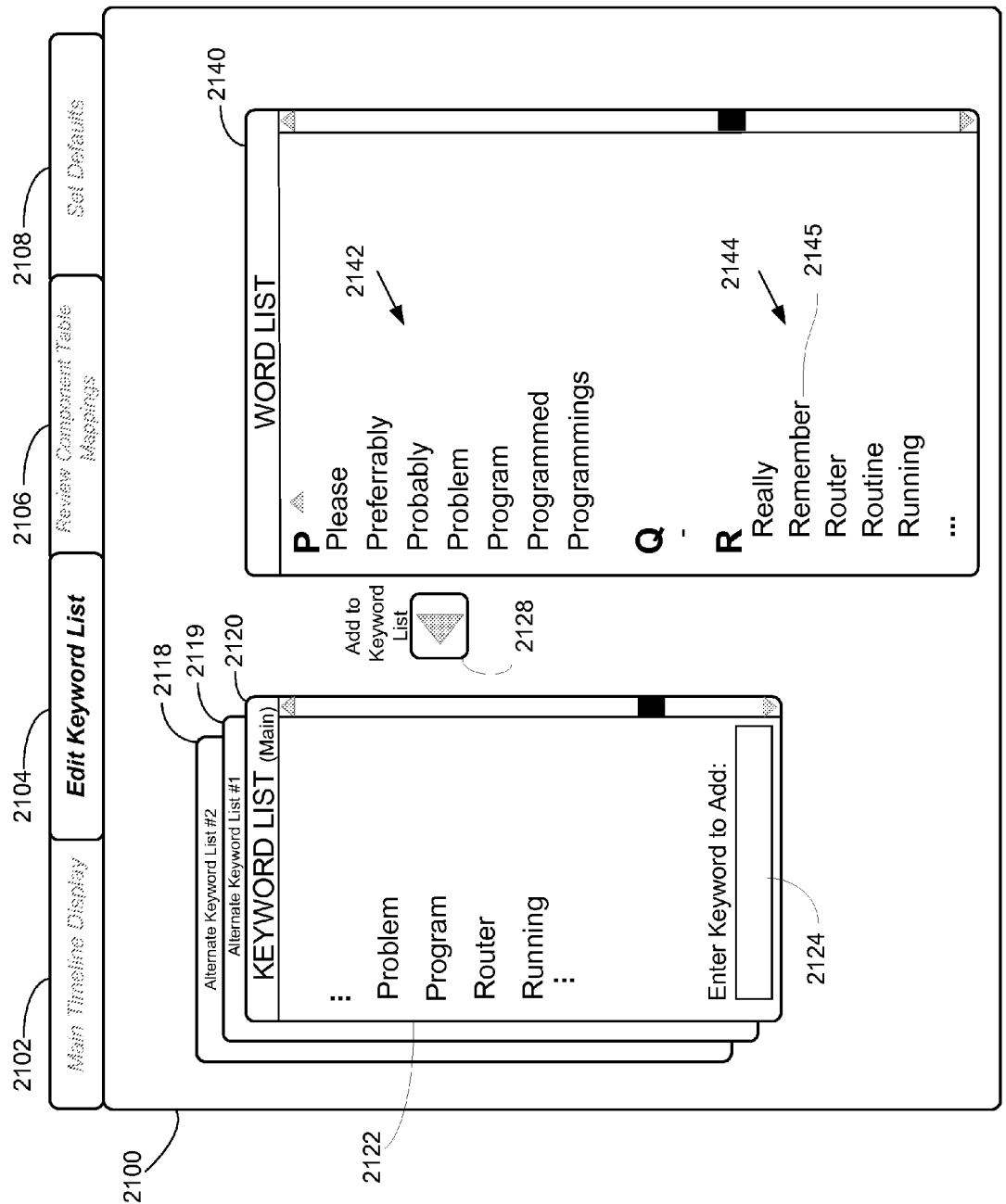

For instance, one such tool is shown in FIG. 21. Depending on the embodiment, the display 2100 shown in FIG. 21 may be generated by the IG module and may be presented in response to a user selecting one of the function tabs 2102, 2104, 2106, 2108 along the top of the display 2100. For particular embodiments, the Edit Keyword List 2104 tab is use to view and edit the keyword list (e.g., set of keywords) while the other tabs 2102, 2106, 2108 allow other functions to be invoked. For example, the Main Timeline Display tab 2102 presents the timeline display similar to the one shown in FIG. 13. While the Review Component Table Mappings tab 2106 allows the users to review the entries and times in the various component mapping tables. The Set Defaults tab 2108 allows the user to configure how the main timeline display is presented, as well as other options. Other tabs and functions could be present in other embodiments.

When the Edit Keyword List tab 2104 is selected in particular embodiments, the display presents the Keyword List 2120 and an indexed word list, or simply Word List 2140. Each of these contains a list of words. For the Keyword List 2120, the words 2122 are a subset of those found in the Word List 2140. Depending on the embodiment, the Word List 2140 may have the words grouped and alphabetized by the initial letter of the word. For instance, in the portion of the Word List 2140 shown in FIG. 21, a section 2142 of words begins with "P" and another section 2144 begins with "R" are shown.

Depending on the embodiment, the user can transfer words from the Word List 2140 to the Keyword List 2120 and/or add words to the Keyword List 2120 in various ways. For instance, one approach is to select a word in the Word List 2140, such as the word "Remember" 2145, and select the icon 2128 to copy it to the Keyword List 2120. While another approach is to type the desired word to add to the Keyword List 2120 in a field 2124 provided at the bottom of the Keyword List 2120 and select "Enter." At this point, the appropriate mapping module (e.g., the audio mapping module 440) maps the added keyword for the communication. Depending on the embodiment, this module may perform the mapping once the keyword has been added to the Keyword List 2120 or may perform the mapping at the time a GUI is generated to display keywords for the communication. To remove a word in the Keyword List 2120, the user can select the word in the Keyword List 2120 and right-click the user's mouse to display another smaller popup menu that allows a "delete" function to be invoked. Again, the appropriate mapping module updates the keyword mapping for the communication to remove the keyword during the appropriate time.

In particular instances, there may be multiple Keyword Lists. For instance, in one embodiment, there may be a "main" Keyword List 2120 along with two alternate Keyword Lists 2118, 2119. Such capability allows a user to create different keyword lists for different purposes. For example, a first keyword list could focus on a first type of content or address a certain subject matter, while a second keyword list could focus on a second type of content or address another subject matter. Various other tools or techniques can be devised by one skilled in the art to edit and create each of the keyword lists in light of this disclosure.

Other Potential Applications

As previously noted, the MCVT 156 illustrated above is primarily used in contact center applications. For instance, the MCVT 156 illustrated above can be used for reviewing the content of a call for agent performance evaluations as well as for ascertaining the context of a call when transferring the call to escalate a customer service issue. With that said, it is contemplated within the scope of the invention that various embodiments of the MCVT 156 may also be used to review other types of communications in addition to audio communications (e.g., voice calls and/or audio recordings). For instance, in particular embodiments, the MCVT 156 (e.g., the IG module) may be configured to construct GUIs to analyze text message exchanges between parties, email exchanges between parties, and/or Web chats conducted between parties. In particular instances, the IG module may only provide the ability for a party to review the text associated with a particular keyword or keyphrase when a communication involves an exchange of text messages, emails, or a Web chat. However, in other instances, the process for mapping such a communication may involve generating an audio file of the communication so that audio associated with a particular keyword and/or keyphrase may be provided. For example, if the communication involves an exchange of text messages between two parties, the process for mapping the communication may involve creating one or more text files for the text messages and then generating an audio file from the text files using some type of text-to-speech software application.

Deposition Review

Further, in various embodiments, the MCVT 156 may be configured to be used to review communications in other industries besides the contact center industry. For instance, in particular embodiments, the MCVT 156 may be configured so that individuals in the legal industry may use the MCVT 156 for reviewing depositions (e.g., audio and/or video recorded). Depositions and/or court proceedings are typically recorded either via audio and/or video and the audio and/or video data can be mapped by various embodiments of the MCVT 156, along with keyword data, to facilitate subsequent searching, locating, and reviewing of the depositions and/or court proceedings. Thus, attorneys may use these particular embodiments of the MCVT 156 to quickly review the contents of a deposition or court proceeding, annotate the deposition or proceeding accordingly, and store the results for another party to review.

In such applications, the keyword mapping table can be presented to a user to allow him to edit the table so as to define which concepts are of vital importance. For instance, in particular embodiments, the MCVT 156 may allow the user to develop and use multiple keyword mapping tables to reflect and track different concepts. For example, one keyword table may be generated and labeled as "defendant's statements on damages" to define a keyword list of words that reflect statements relevant to damages. While another table may be generated and labeled as "expert's statements on infringement." By retrieving and using the appropriate keyword table in these embodiments, the GUI can reflect the appropriate portions of a deposition that relate to different legal concepts. Similarly, multiple keyphrase tables could be defined for tracking different concepts in a single deposition.

Further, the MCVT 156 can be configured in particular embodiments so that a user can view the word index table in a small popup window on the main display, and select a particular word in the word index table to jump to the appropriate location on the timeline. This would allow an attorney to select any word from the word index table to jump to the corresponding location in the deposition.

Finally, in particular embodiments, the MCVT 156 can be configured to allow video mapping to be easily incorporated. For instance, a user may use the MCVT 156 to easily identify portions of a video deposition where the deponent stated certain keywords or keyphrases. Snippets of video could then be played, similar to portions of audio that are retrieved and played. Further, mechanisms can be defined by the MCVT 156 to bookmark the locations by using the annotation capabilities.

Process Control Monitoring

Not every application of the MCVT 156 requires a speech component to be continuously present in conjunction with a timeline. For example, in one embodiment the MVCT 156 may be used to record communications and events occurring in a process control booth involving a process control operator. For example, the timeline may represent the operator's work shift and different types of events may be received as inputs, which are categorized by type. For instance, some of the events may represent call origination while other events may represent inputs that measure signals associated with actuators, valve controls, or motor speed.

In this particular instance, a predefined set of components may be associated with a timeline. In addition, unlike other embodiments in which the components are associated with a communication, this embodiment may be associated with one or more communications and components together with a work shift. For instance, in terms of FIG. 10 that shows the hierarchy of communications, channels, components, and component mappings, a new, higher construct, such as a work shift, may be defined in an embodiment and this new construct may have a unique identifier. At a high level, the work shift in the hierarchy correlates the communications, channels, components, etc. together. Thus, one skilled in the art could modify the data architecture shown in FIG. 10 to associate a work shift (or some other construct depending on the application) to multiple communications, channels, components, etc.

For example, the inputs to the MCVT 156 could be speech associated with a particular telephone in a control booth. During the shift of the operator, the operator may occasionally use the phone to receive instructions for instance, however it is not expected that the operator would be on the phone continuously. In this particular example, three distinct events are also received. Of these, two of the events are outputs reflecting actions of the operator and one is an input reflecting a measured speed of certain motorized equipment.

Figure 22:
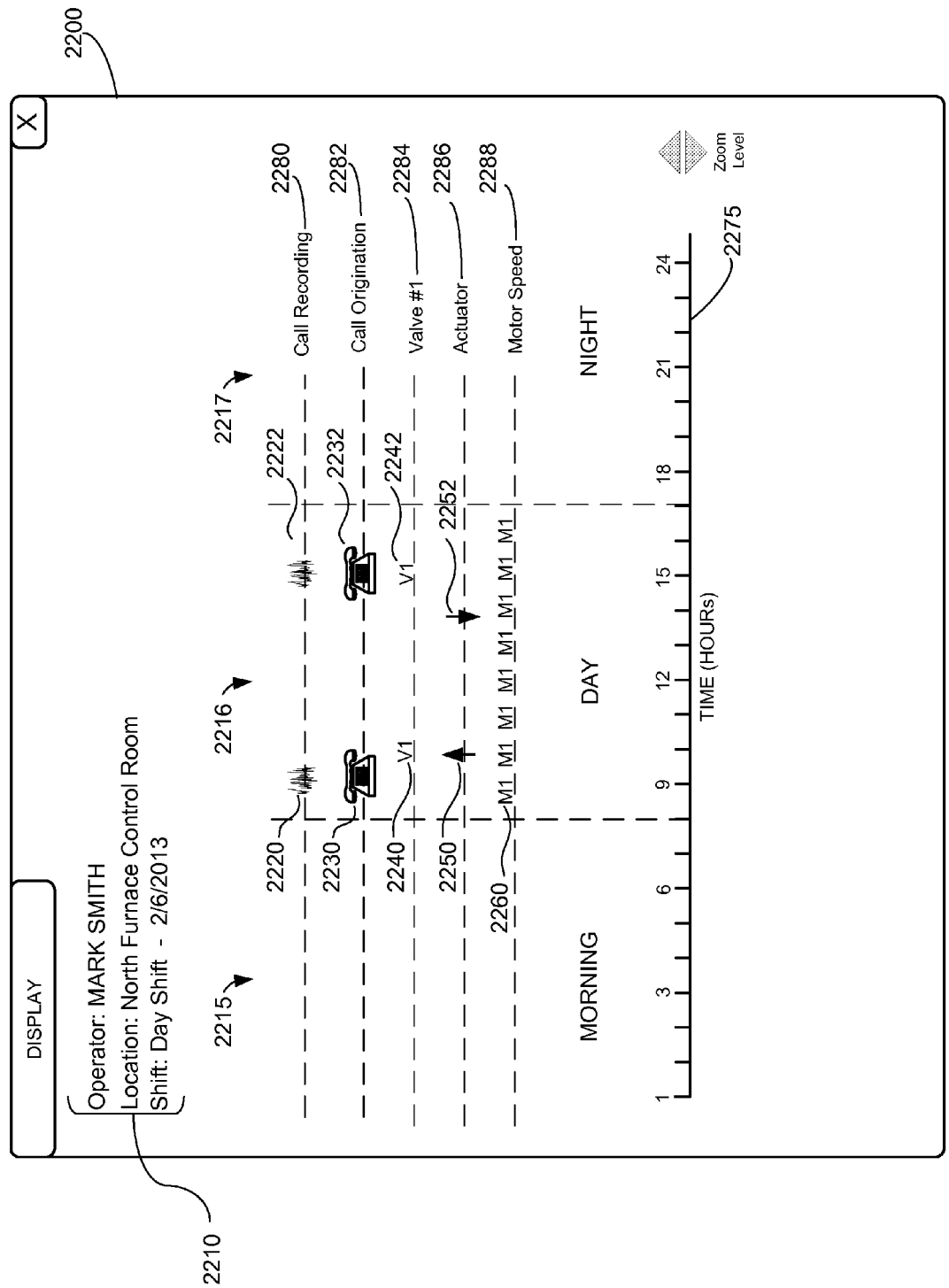

Accordingly, an embodiment of the GUI 2200 presented by the IG module is shown in FIG. 22 for this example. In this embodiment, the context information 2210 indicates the operator's name, the location of the process control booth, and the relevant shift. In addition, the timeline 2275 reflects a twenty-four hour period with three shift sections 2215, 2216, and 2217 delineated. These shift sections 2215, 2216, 2217 correspond to the morning, day, and night shifts. Various components are shown and reflect the speech or call recording component 2280, the call origination event component 2282, the valve #1 output event component 2284, the actuator output event component 2286, and the motor speed input control event component 2288.

A review of the interface shows that the operator handled two calls 2220, 2222 at approximately 9:00 a.m. (0900 hours) and 3:00 p.m. (1500 hours). The origination of these two calls 2220, 2222 is also reflected by the presences of icons 2230, 2232. It is further apparent that shortly after the first call 2230, actions were initiated by the operator. Specifically, icon V1 2240 represents a control signal sent to valve #1. Similarly, icon 2250 represent a control signal sent to an actuator. Another control signal represented by icon 2252 was sent to the actuator at approximately 1400 hours and another control signal represented by icon 2242 was sent to the value #1 when the second call was handled 2232 at approximately 1500 hours. All during the shift, periodic motor speed measurements were received as indicated by the icons 2260 associated with the motor speed input control event component 2288.

In this particular instance, selecting an icon by the user may provide further information regarding the particular occurrence of the component. For instance, selecting a speech icon 2220, 2222 may allow the speech of a particular call to be reviewed. While, selecting a phone icon 2230, 2232 could provide information about when a particular call occurred, whether the call was incoming or outgoing, the phone number of the other party, etc. Selecting a valve component icon 2240, 2242 could indicate what actions the operator took for the particular occurrence of sending a control signal to the value. Similarly, selecting an actuator icon 2250, 2252 could indicate similar information. Finally, selecting one of the motor speed input icons 2260 could indicate the speed in r.p.m. for a particular measurement of the motor speed.

Thus, in particular instances, the MCVT 156 may be used as a diagnostic tool to analyze events that occurred during a shift, allow the user to scroll to view events that occurred during the shift, and/or zoom in on the shift to further analyze various components and the icons displayed. In addition, under various circumstances, the user may select to hide or restore various components from the view. That is, in particular instances, hiding a component may be useful if there are too many icons displayed to easily comprehend on the interface. For example, the periodic motor speed measurement icons 2260 could be hidden as they may occur every few minutes and crowd the display. Further, in particular instances, it may not be necessary to incorporate speech analytics to generate a word list, keyword list, or a transcript of one of the calls if desired.

Compliance Verification

In other embodiments, the MCVT 156 may be configured to facilitate review of an interaction between an employee and a customer for compliance verification purposes. For instance, a company may require an employee to inform a customer of certain policies for certain conditions. For example, an employee engaged in taking sales orders may be required to inquire whether the customer would like to receive free shipping with the order by opening a credit account. In this example, the exchange between the employee and the customer could be analyzed by the MCVT 156 to determine whether the words "free shipping" occurred in the temporal proximity of "open" and "credit account" when the word "order" or "buy" were stated by the customer. That is, the MCVT 156 may allow easy determination of whether certain keywords are present in the exchange conducted between the employee and the customer. This would allow verification of whether the agent offered free shipping to a customer when a new account was opened.

This example demonstrates an application in which the user may choose to use a predefined keyword list to analyze the exchange conducted between the employee and the customer. That is, in this case, the keyword list may not be generated from the word index table but instead be established beforehand for the purpose of ascertaining whether the employee conformed to expected behavior. In this example, the embodiment of the MCVT 156 can be configured to easily inform the user to select the predefined keyphrase and thus allows the user to easily determine whether the employee conformed to the policy.

Detection of Key-Emotions

Finally, it is contemplated to be within the scope of particular embodiments of the MCVT 156 to be configured to distinguish emotional information with respect to a communication. As those of ordinary skill in the art are aware, speech analytics technology may also be used to detect the occurrence of particular emotions with respect to a party involved in a communication. Thus, for these particular embodiments, the MCVT 156 may not only provide information (e.g., audio, text, and/or video) with respect to a particular keyword or keyphrase spoken during a communication but may also (or instead) provide information with respect a particular key-emotion that one of the parties experienced during the communication. Such key-emotions may be displayed on a GUI in a similar fashion as keywords and/or keyphrases are displayed and links may be associated with each key-emotion so that a party may review the audio, text, and/or video related to the key-emotion. The establishment of a key-emotion mapping table can be accomplished in various embodiments and different icons can be associated with "anger," "excitement," "anxiety," etc. Further, in particular embodiments, the MCVT 156 can be further configured to classify certain portions of a party's speech as exhibiting these emotions.

Video Monitoring

Another application of the MCVT 156 according to various embodiments is analyzing video surveillance data. Video surveillance data is often characterized by lengthy video segments, which often may have brief moments where content is of interest. Thus, manually searching for content in surveillance videos can be tedious and error prone. By way of an example, a department store has observed shrinkage of inventory (e.g., products on the shelves being less than the quantities reported to be available in the store). It is suspected that a salesperson may not be charging particular customers for all of the items being purchased. For instance, a friend of the salesperson will enter the department store and pick out items to purchase. The friend then takes the items to a register and the associated salesperson enters some of the items into the register for purchase, but purposely skips one or more items. This results in the friend not being charged for all of the items brought to the register, although the uncharged items are bagged with the items that the friend actually pays for.

The managers would like to confirm their suspicions regarding the particular salesperson. In this instance, the department store is a very large store with multiple floors and has ten different registers stationed throughout the multiple floors. When a salesperson performs a transaction (e.g., rings up a customer) at one of the registers, the salesperson is required to first enter a unique employee identifier into the register so that the salesperson is associated with the particular transaction. In addition, each register is equipped with a video camera that records all of the transactions taking place at the particular register.

Although salespersons are generally assigned to a particular department (e.g., women's clothing) within the department store, a salesperson from one department may occasionally use a register in a different department to perform a transaction. Thus, as a result, it is not uncommon for a salesperson to take a customer to a register in a different department or to assist a customer in a different department so that the customer is more quickly checked out when making a purchase.

With respect to the instances in which the suspected salesperson is not charging for all the items, the managers suspect that the particular salesperson is using another salesperson's identifier when engaging in this practice. Therefore, the managers are interested in viewing any transactions involving the particular salesperson and especially those transactions in which the particular salesperson used another salesperson's identifier. As mentioned, there are video cameras at each cash register that could be reviewed by the managers. However, this would involve reviewing videos that are eight to twelve hours in length for each of the ten locations. Further, there are several weeks of videos to be reviewed. Consequently this would be a very time consuming task if manually performed.

Figure 23:
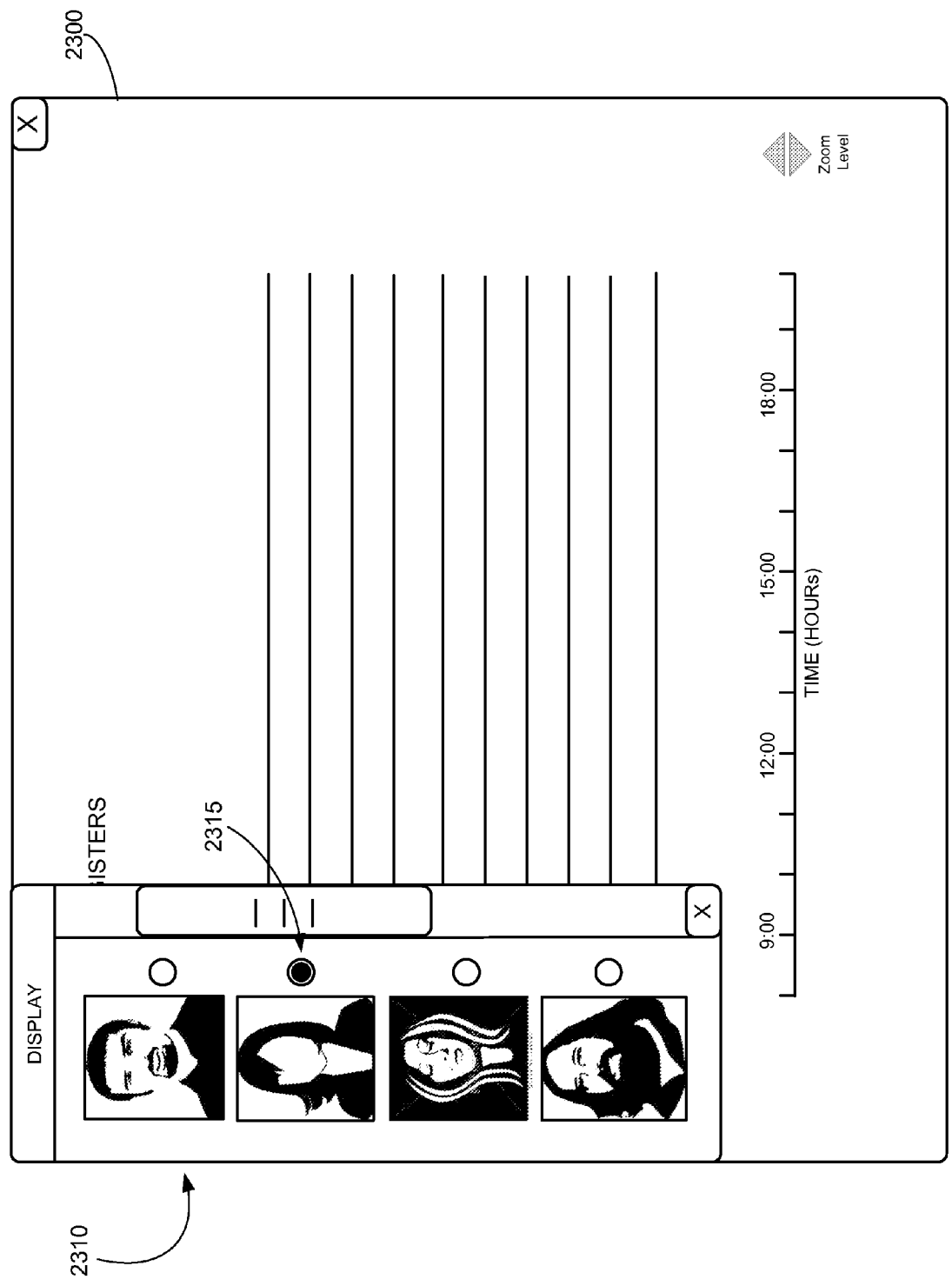

Instead, in this instance, an embodiment of the MCVT 156 is used to analyze the videos. For this particular embodiment, the video mapping module 445 is configured to detect and distinguish faces. Thus, the video mapping module 445 can identify where different faces occur in the videos. For instance, a user may provide a photo of the salesperson of interest as a content object to be searched and the video mapping module 445 may, in turn, search for instances in the videos where the employee appears and may identify these appearances by notating a timeline with an icon. For example, turning to FIG. 23, the user could be presented with a display 2300 that provides a dropdown window 2310 presenting various employee photos for selection. The user selects the particular salesperson of interest using a selector 2315 and the MCVT 156 then uses the selected photo to search the set of videos for the registers.

Figure 24:
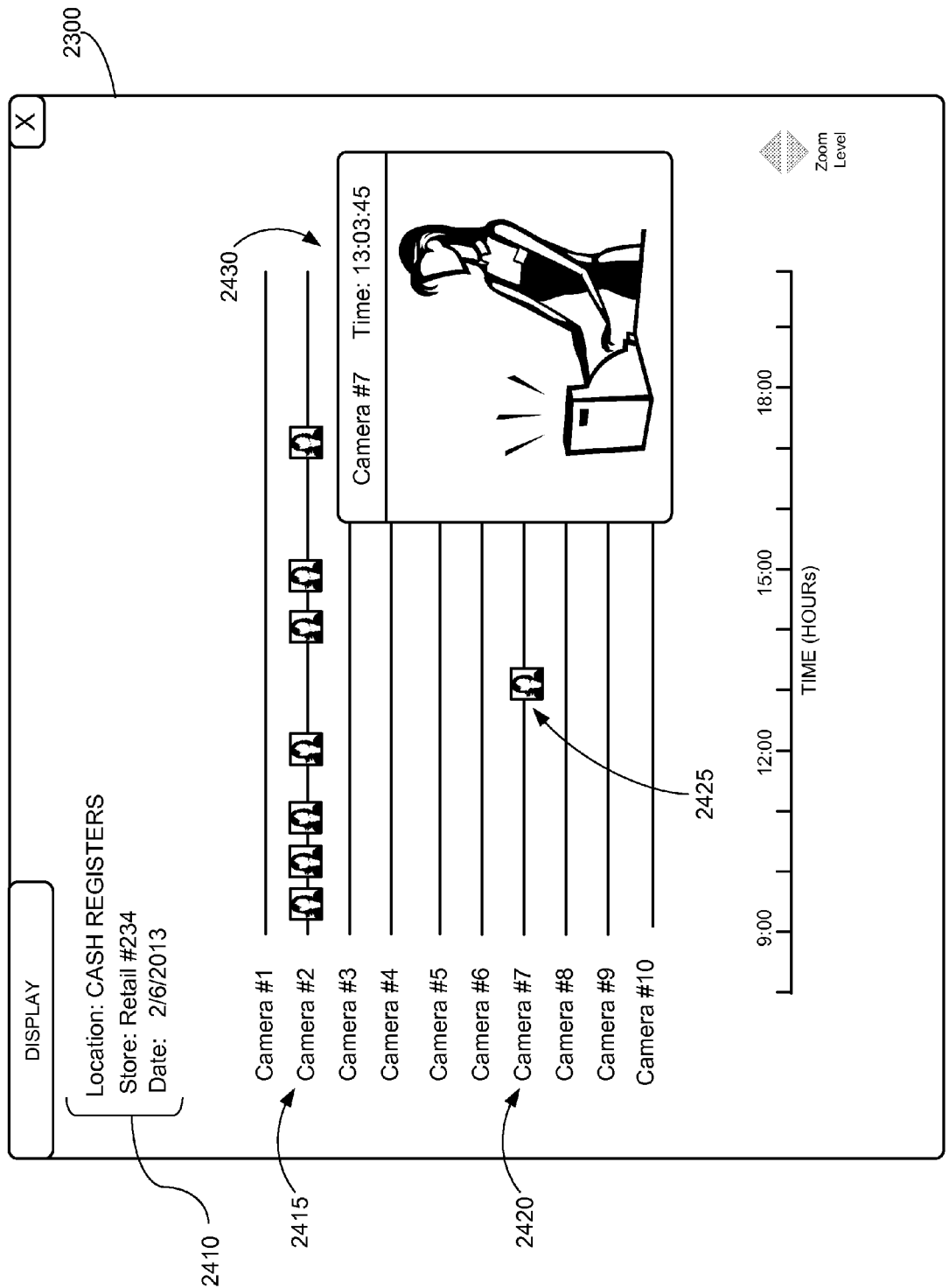

Accordingly, the MCVT 156 displays groups of video timelines, in which each timeline represents a distinct video for a different cash register location with the appropriate icons indicated at the times the salesperson of interest has been identified. One embodiment of such a display 2400 is shown in FIG. 24. In this embodiment, the display 2300 presents context information 2410 that identifies the store, date, and the type of cameras involved. In addition, cameras are shown on the display 2300 and are labeled from #1 to #10 to represent the cash register cameras in the store. Each camera is represented by a horizontal line.

Thus, after the MCVT 156 has searched the stored videos for each camera, icons are placed where the salesperson of interest has been detected. In this instance, the salesperson is repeatedly shown as being detected in the video for camera #2 2415. However, this is not surprising since camera #2 records the cash register the salesperson is assigned to. In addition, camera #7 2420 displays the salesperson's icon 2425. Thus, this may readily indicate a reason to review the corresponding video at this time.

Upon selecting the icon 2425, the user is presented with a popup window 2430 that shows the salesperson of interest at the cash register. Thus, it becomes readily apparent that in this example, management can quickly identify where the particular salesperson of interest appears in the register videos spanning an extended time period.

Another video application that may involve reviewing videos for content is in an instance in which a user recalls some text associated with a video, but may not remember the day, time, or other information to help in locating the occurrence of the text in the video. For example, a video editor in a newsroom may recall a video clip was played on a newscast in the past several weeks. In this instance, the editor cannot remember the exact day the clip was played, but he can recall that a quote was given that "[n]o tax increase will occur under my watch." Thus, in this example, the news editor may use the MCVT 156 to process the newscast videos to locate occurrences of one or more keywords, such as "tax"+"increase" used in the proximity of "watch." The number of occurrences detected that include the keywords may be fairly limited, and once identified the appropriate news clip may be easily viewed and confirmed.

Exemplary Processing Device Architecture

Figure 25:
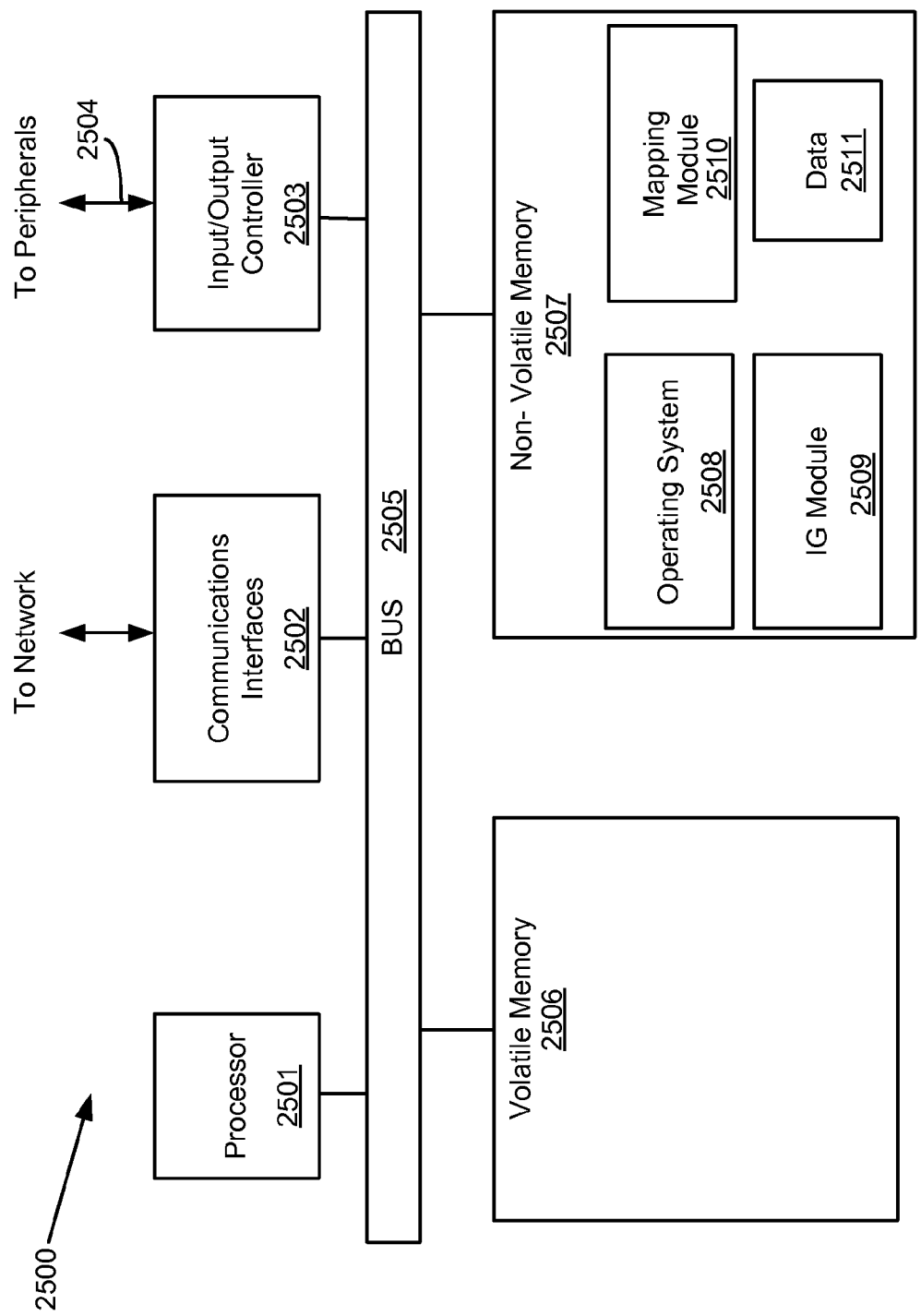
FIG. 25 is an exemplary schematic diagram of one embodiment of the multi-component viewing tool for practicing the technologies disclosed herein.

As discussed in conjunction with FIG. 1, the contact center architecture 100 may comprise various components that comprise a processing system. FIG. 25 is an exemplary schematic diagram of a processing system 2500 that may be used in an embodiment of the MCVT to practice the technologies disclosed herein. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 25, the processing system 2500 may include one or more processors 2501 that may communicate with other elements within the processing system 2500 via a bus 2505. The processor 2501 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 2500 may also include one or more communications interfaces 2502 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 2503 may also communicate with one or more input devices or peripherals using an interface 2504, such as, but not limited to: a keyboard, a mouse, a touch screen/display input, microphone, pointing device, etc. The input/output controller 2503 may also communicate with output devices or peripherals, such as displays, printers, speakers, headsets, banner displays, etc.

The processor 2501 may be configured to execute instructions stored in volatile memory 2506, non-volatile memory 2507, or other forms of computer-readable storage media accessible to the processor 2501. The volatile memory 2506 may comprise various types of memory technologies, including, but not limited to: random access memory ("RAM"), dynamic random access memory ("DRAM"), static random access memory ("SRAM"), and other forms well known to those skilled in the art. The non-volatile memory 2507 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 2507 may store program code and data, which also may be loaded into the volatile memory 2506 at execution time. Specifically, the non-volatile memory 2507 may store one or more computer program modules, such as an IG module 2509, one or more mapping modules 2510, and/or operating system code 2508 containing instructions for performing the process and/or functions associated with the technologies disclosed herein. In addition, the IG module 2509 and/or mapping modules 2510 may also access, generate, or store data 2511 (including the various mapped component data) in the non-volatile memory 2507, as well as in the volatile memory 2506. The volatile memory 2506 and/or non-volatile memory 2507 may be used to store other information including, but not limited to: records, applications, programs, scripts, source code, object code, byte code, compiled code, interpreted code, machine code, executable instructions, or the like. These may be executed or processed by, for example, the processor 2501. These may form a part of, or may interact with, the IG module 2509 and/or mapping modules 2510.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method comprising the steps of:
   analyzing an audio communication between a first party and a second party to develop a transcript of the audio communication;
   analyzing words spoken during the audio communication by at least one computer processor to develop a set of keywords, in which the set of keywords comprises a subset of the words spoken during the audio communication;
   providing a graphical user interface ("GUI") to display on a computer monitor, the GUI comprising a timeline representing the audio communication;
   displaying a plurality of sets of icons on the GUI in conjunction with the timeline, wherein each set of icons comprises a text-based icon and an audio-based icon representing an occurrence of a keyword in the audio communication, the keyword being from the set of keywords and the text-based icon and the audio-based icon being displayed on the GUI at one or more locations with respect to the timeline proximate to a time of the occurrence of the keyword in the audio communication;
   receiving an input from a user as a result of the user selecting a particular text-based icon or a particular audio-based icon representing a particular occurrence of a particular keyword in the audio communication; and
   after receiving the input:
      displaying a portion of the transcript containing the particular occurrence of the particular keyword if the user selected the particular text-based icon representing the particular occurrence of the particular keyword; and
      playing a portion of the audio communication containing the particular occurrence of the particular keyword if the user selected the particular audio-based icon representing the particular occurrence of the particular keyword.

2. The method of claim 1, wherein the portion of the transcript is less than an entirety of the transcript of the audio communication and the portion of the audio communication is less than an entirety of the audio communication.

3. The method of claim 1, wherein each keyword in the set of keywords has a number of occurrences in the audio communication that exceed a threshold value.

4. The method of claim 1, wherein the audio communication is associated with a voice call and the method further comprises the step of:
   transferring the voice call to the user wherein (1) the voice call continues between the user and the second party and (2) the computer monitor displaying the GUI is a computer monitor being used by the user.

5. The method of claim 1 further comprising the steps of:
   receiving an annotation from the user, wherein the annotation corresponds to a particular time associated with the audio communication; and
   displaying an annotation icon representing the annotation on the GUI at a location with respect to the timeline proximate to the particular time associated with the audio communication.

6. The method of claim 1, wherein the GUI identifies at least one of the first party and the second party as being associated with each occurrence of the keywords in the audio communication.

7. The method of claim 1, wherein the GUI displays an information resource icon at a location with respect to the timeline proximate to a time when the first party accessed an information resource during the audio communication.

8. A tangible computer-readable storage medium comprising computer-executable instructions configured to cause at least one computer processor to:

analyze an audio communication between a first party and a second party to develop a transcript of the audio communication;

analyze words spoken during the audio communication to develop a set of keywords, in which the set of keywords comprises a subset of the words spoken during the audio communication;

provide a graphical user interface ("GUI") to display on a computer monitor, the GUI comprising a timeline representing the audio communication;

display a plurality of sets of icons on the GUI in conjunction with the timeline, wherein each set of icons comprises a text-based icon and an audio-based icon representing an occurrence of a keyword in the audio communication, the keyword being from the set of keywords and the text-based icon and the audio-based icon being displayed on the GUI at one or more locations with respect to the timeline proximate to a time of the occurrence of the keyword in the audio communication;

receive an input from a user as a result of the user selecting a particular text-based icon or a particular audio-based icon representing a particular occurrence of a particular keyword in the audio communication; and after receiving the input:
 display a portion of the transcript containing the particular occurrence of the particular keyword if the user selected the particular text-based icon representing the particular occurrence of the particular keyword; and
 play a portion of the audio communication containing the particular occurrence of the particular keyword if the user selected the particular audio-based icon representing the particular occurrence of the particular keyword.

9. The tangible computer-readable storage medium of claim 8, wherein the portion of the transcript is less than an entirety of the transcript of the audio communication and the portion of the audio communication is less than an entirety of the audio communication.

10. The tangible computer-readable storage medium of claim 8, wherein each keyword in the set of keywords has a number of occurrences in the audio communication that exceed a threshold value.

11. The tangible computer-readable storage medium of claim 8, wherein the audio communication is associated with a voice call and the computer-executable instructions are further configured for causing the at least one computer processor to:

transfer the voice call to the user wherein (1) the voice call continues between the user and the second party and (2) the computer monitor displaying the GUI is a computer monitor being used by the user.

12. The tangible computer-readable storage medium of claim 8, wherein the computer-executable instructions are further configured for causing the at least one computer processor to:

receive an annotation from the user, wherein the annotation corresponds to a particular time associated with the audio communication; and display an annotation icon representing the annotation on the GUI at a location with respect to the timeline proximate to the particular time associated with the audio communication.

13. The tangible computer-readable storage medium of claim 8, wherein the GUI identifies at least one of the first party and the second party as being associated with each occurrence of the keywords in the audio communication.

14. The tangible computer-readable storage medium of claim 8, wherein the GUI displays an information resource icon at a location with respect to the timeline proximate to a time when the first party accessed an information resource during the audio communication.

15. A system comprising at least one computer processor configured to:

analyze an audio communication between a first party and a second party to develop a transcript of the audio communication;

analyze words spoken during the audio communication to develop a set of keywords, in which the set of keywords comprises a subset of the words spoken during the audio communication;

provide a graphical user interface ("GUI") to display on a computer monitor, the GUI comprising a timeline representing the audio communication;

display a plurality of sets of icons on the GUI in conjunction with the timeline, wherein each set of icons comprises a text-based icon and an audio-based icon representing an occurrence of a keyword in the audio communication, the keyword being from the set of keywords and the text-based icon and the audio-based icon being displayed on the GUI at one or more locations with respect to the timeline proximate to a time of the occurrence of the keyword in the audio communication;

receive an input from a user as a result of the user selecting a particular text-based icon or a particular audio-based icon representing a particular occurrence of a particular keyword in the audio communication; and after receiving the input:
 display a portion of the transcript containing the particular occurrence of the particular keyword if the user selected the particular text-based icon representing the particular occurrence of the particular keyword; and
 play a portion of the audio communication containing the particular occurrence of the particular keyword if the user selected the particular audio-based icon representing the particular occurrence of the particular keyword.

16. The system of claim 15, wherein the portion of the transcript is less than an entirety of the transcript of the audio communication and the portion of the audio communication is less than an entirety of the audio communication.

17. The system of claim 15, wherein each keyword in the set of keywords has a number of occurrences in the audio communication that exceed a threshold value.

18. The system of claim 15, wherein the audio communication is associated with a voice call and the at least one computer processor is further configured to:

transfer the voice call to the user wherein (1) the voice call continues between the user and the second party and (2) the computer monitor displaying the GUI is a computer monitor being used by the user.

19. The system of claim 15, wherein the at least one computer processor is further configured to:

receive an annotation from the user, wherein the annotation corresponds to a particular time associated with the audio communication; and display an annotation icon representing the annotation on the GUI at a location with respect to the timeline proximate to the particular time associated with the audio communication.

20. The system of claim 15, wherein the GUI identifies at least one of the first party and the second party as being associated with each occurrence of the keywords in the audio communication.

21. The system of claim 15, wherein the GUI displays an information resource icon at a location with respect to the timeline proximate to a time when the first party accessed an information resource during the audio communication.

* * * * *